United States Patent [19]

Turzillo

[11] 4,011,728
[45] Mar. 15, 1977

[54] MEANS FOR PRODUCING SUBAQUEOUS AND OTHER CAST-IN-PLACE CONCRETE STRUCTURES IN SITU

[76] Inventor: Lee A. Turzillo, 2078 Glengary Road, Akron, Ohio 44313

[22] Filed: Mar. 18, 1976

[21] Appl. No.: 668,231

Related U.S. Application Data

[60] Division of Ser. No. 542,050, Jan. 17, 1975, which is a division of Ser. No. 44, Jan. 24, 1970, Pat. No. 3,726,950, which is a continuation-in-part of Ser. No. 647,026, June 19, 1967, abandoned, which is a continuation-in-part of Ser. No. 365,431, May 6, 1964, Pat. No. 3,345,824.

[52] U.S. Cl. .................................... 61/86; 61/39; 61/45 C; 61/100; 61/50; 61/53.52; 61/54; 61/56; 52/127; 52/169; 52/742; 249/1; 264/32

[51] Int. Cl.$^2$ ................ E02D 7/00; E02D 5/34; E02D 5/64

[58] Field of Search .............. 61/50, 35, 36, 53.6; 52/169, 742, 310, 127; 264/32; 249/1

[56] References Cited

UNITED STATES PATENTS

| | | |
|---|---|---|
| 1,265,164 | 5/1918 | Barry ............................... 61/53.6 |
| 1,530,662 | 3/1925 | Gibbons ............................ 52/378 |
| 3,197,964 | 8/1968 | Fehlmann et al. ................... 61/35 |
| 3,396,545 | 8/1968 | Lamberton ..................... 61/45 X |
| 3,397,260 | 8/1968 | Lamberton ......................... 61/54 |
| 3,555,751 | 1/1971 | Thorgusen ........................ 52/127 |

*Primary Examiner*—Jacob Shapiro
*Attorney, Agent, or Firm*—Donnelly, Maky, Renner & Otto

[57] ABSTRACT

Means for repairing or forming structural bodies of self-hardening fluid cement mortar, in a subaqueous or other situs, utilizing a body-forming cavity including body-shaping walls of porous fabric in combination with openwork matrix means fixedly positioned at the situs. The matrix means is received within the body-shaping walls of porous fabric and connected thereto by tension-restraining tie-elements of predetermined length for controlling limited oppositely outward distension of the opposing walls away from the matrix as determined by the length of the tie-elements, upon reception of fluid mortar or like cementitious material within the body-shaping walls to expand the walls thereof to such given shape and size of the body formed by the cementitious material.

4 Claims, 51 Drawing Figures

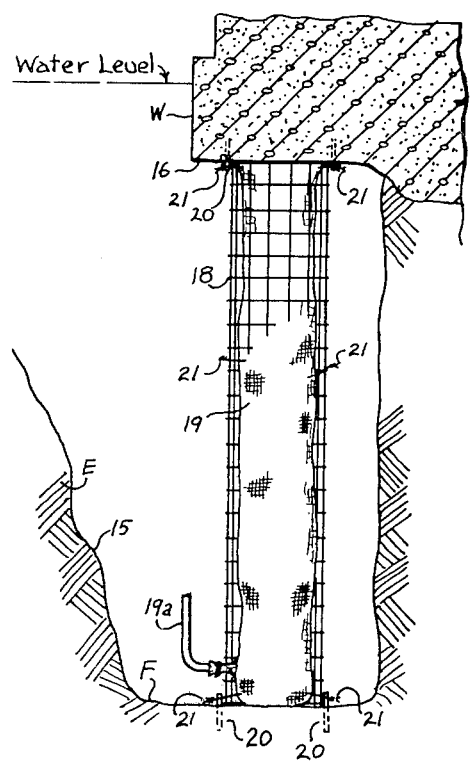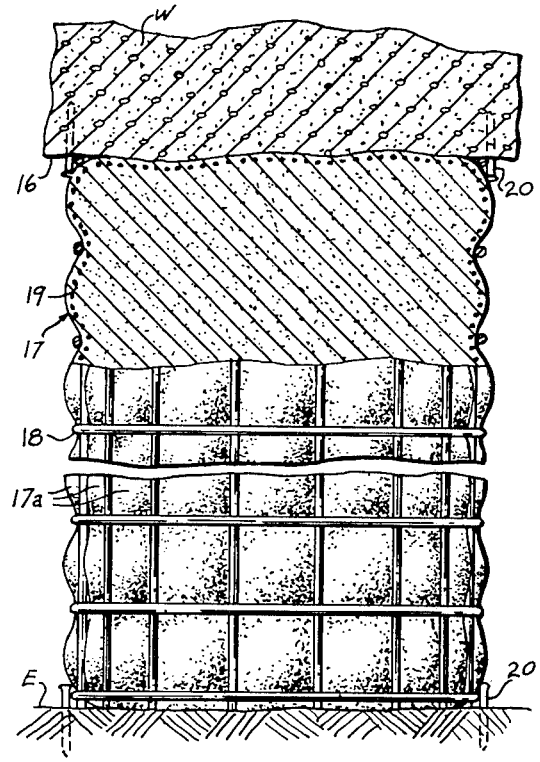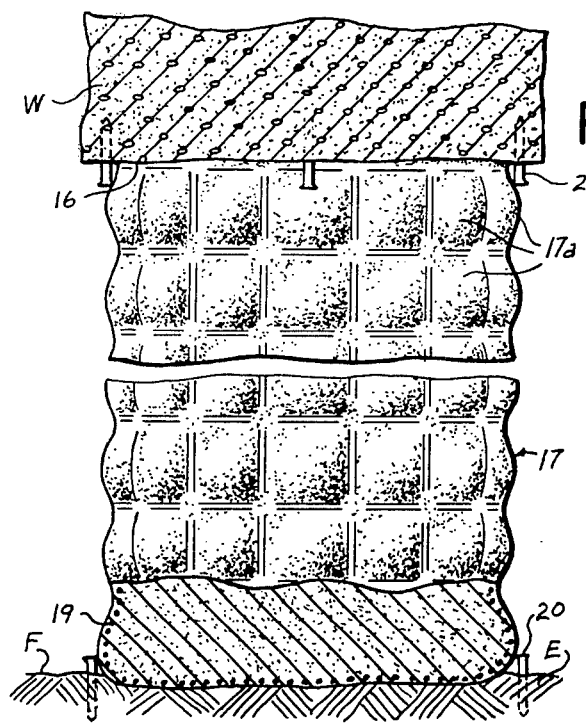

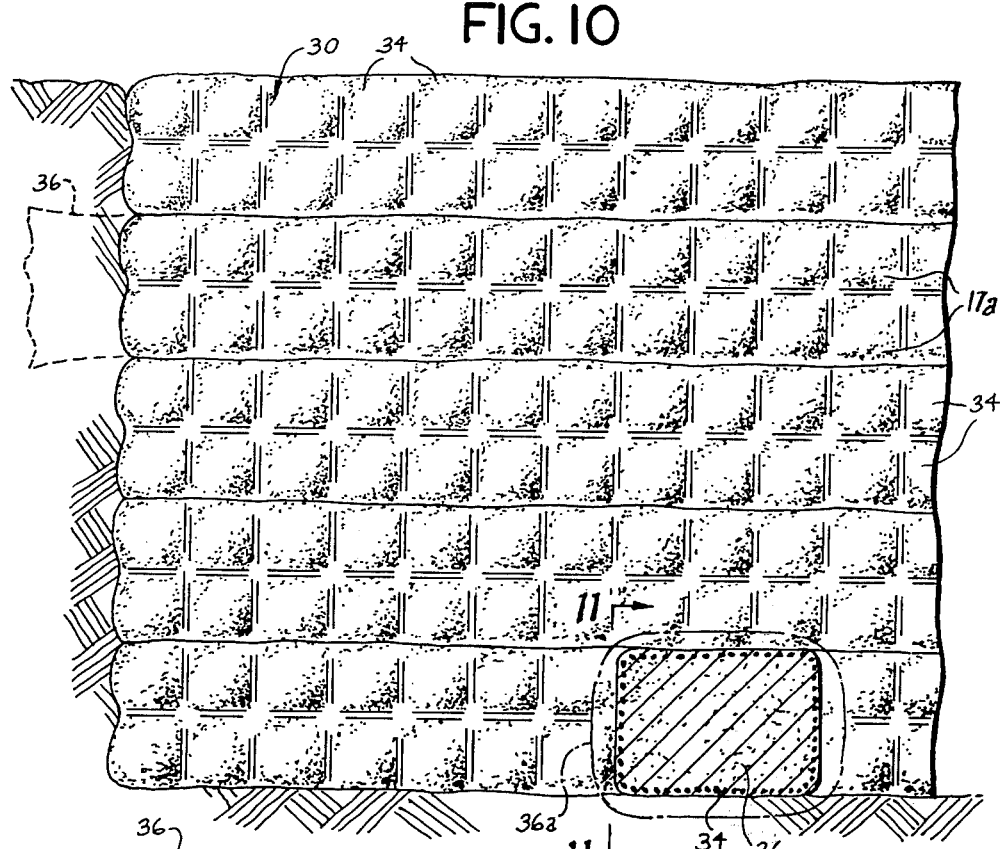
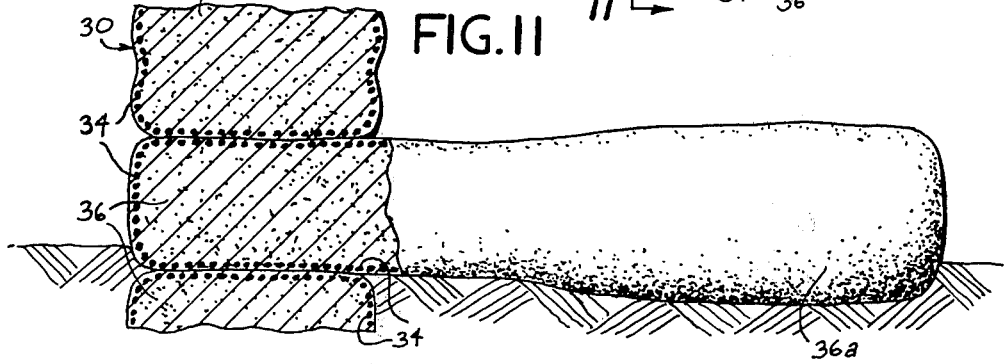
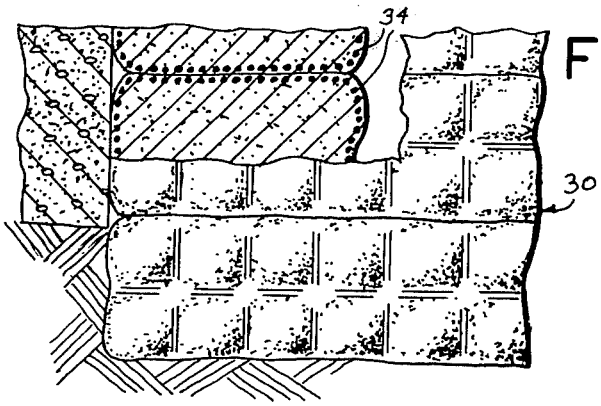

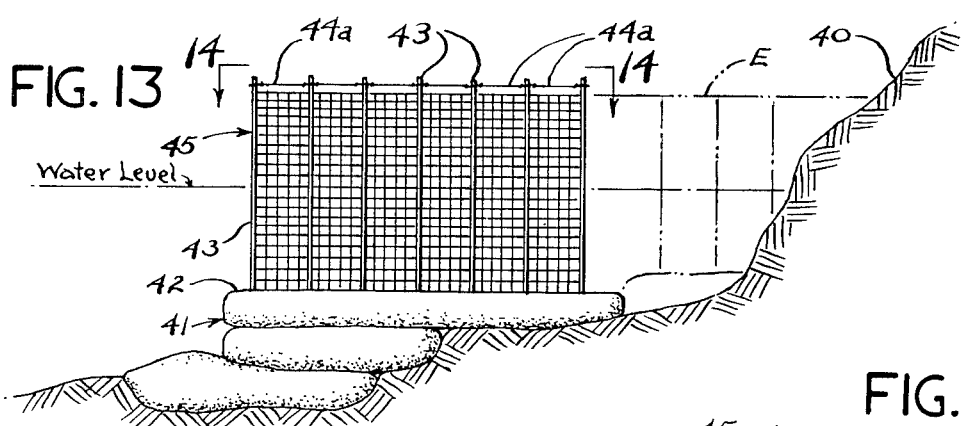
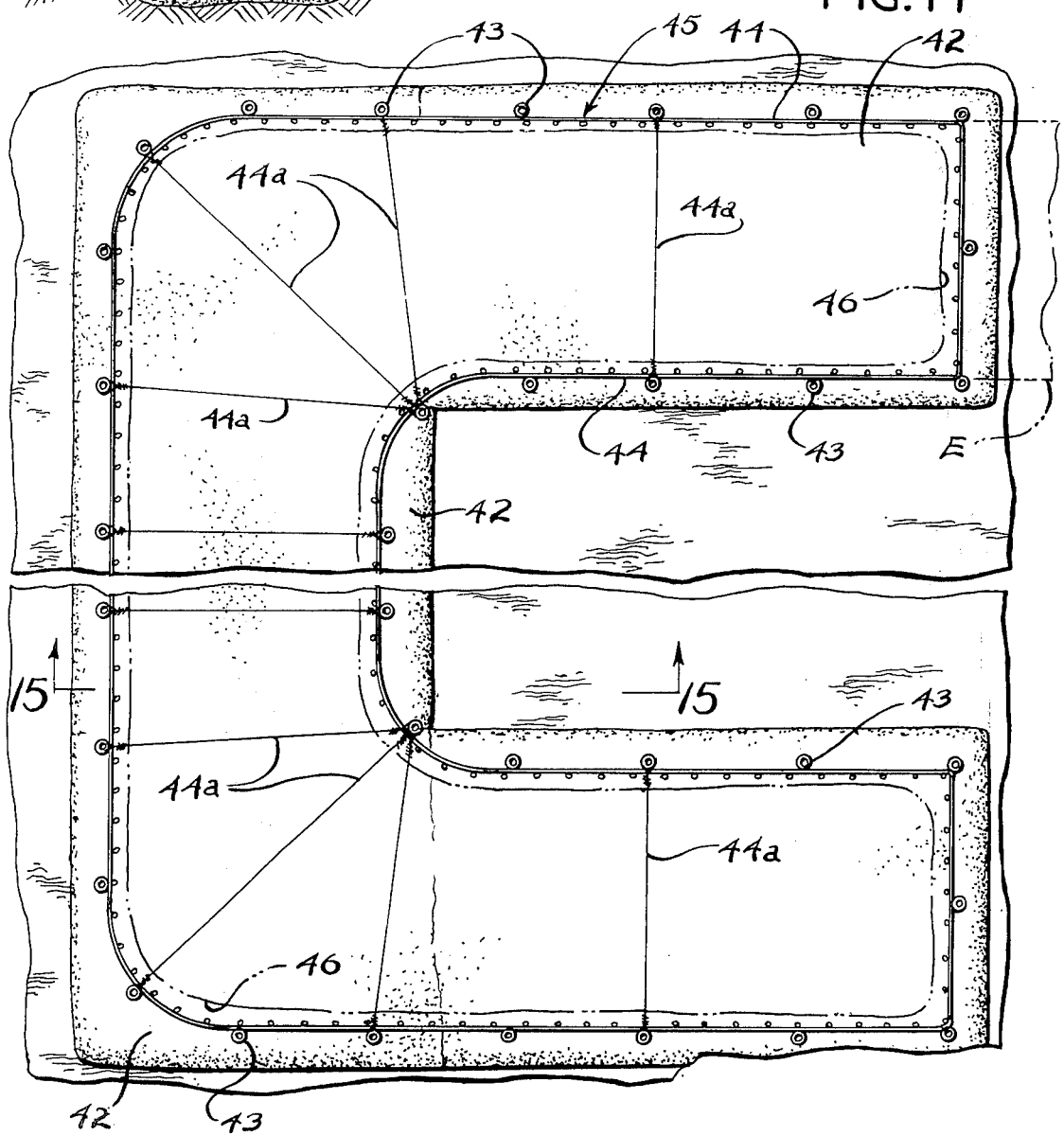

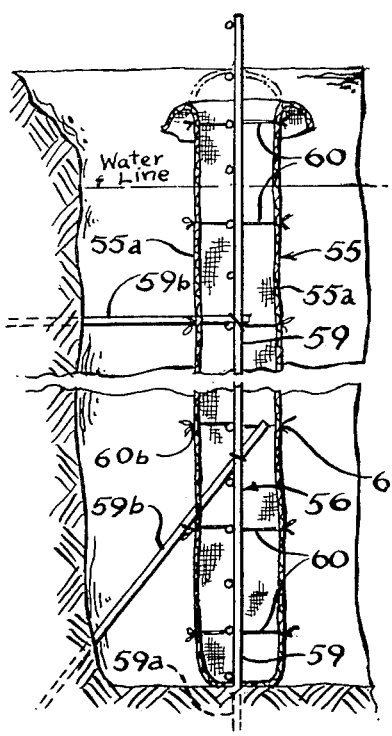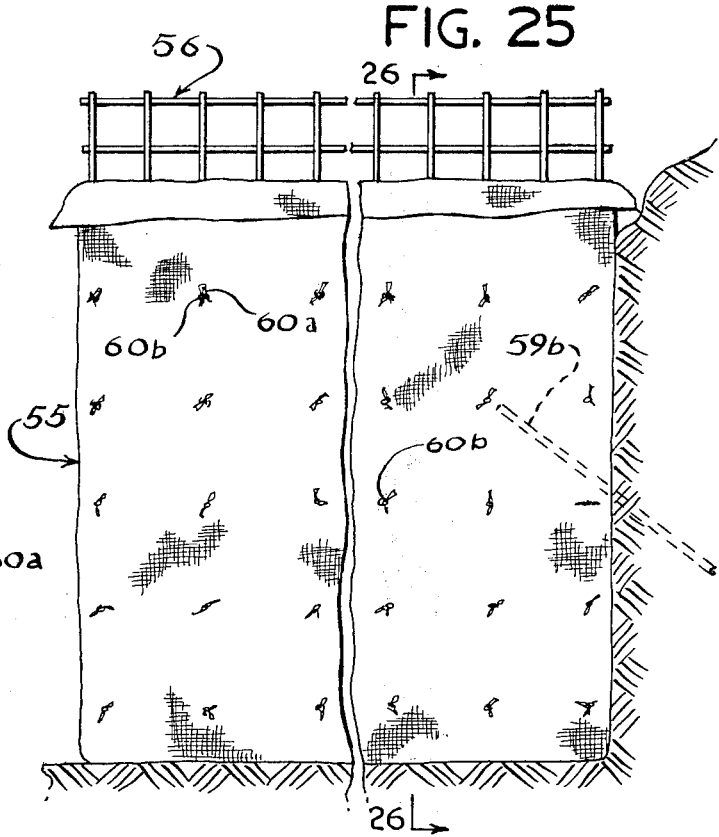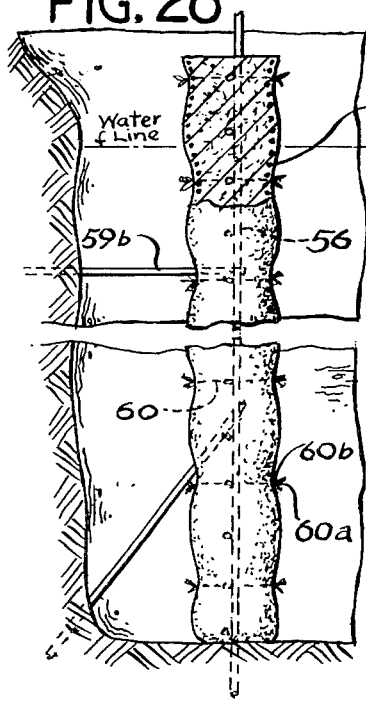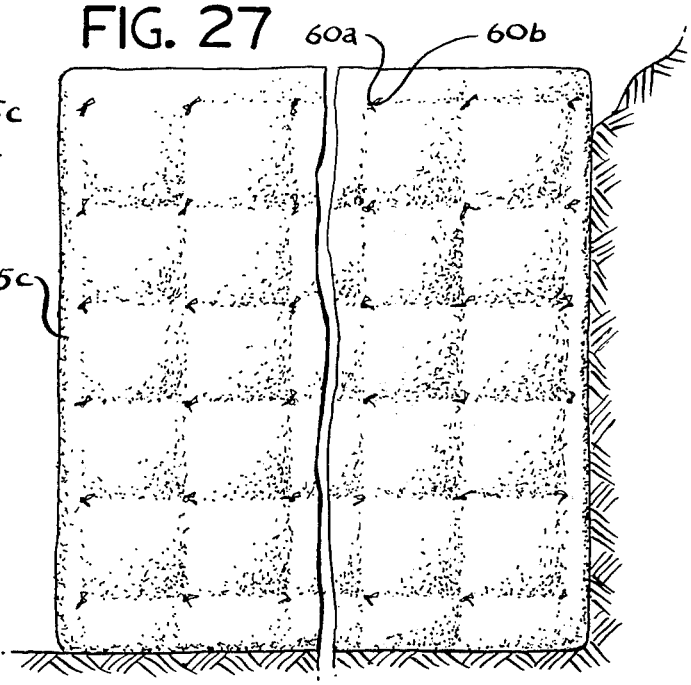

FIG. 32
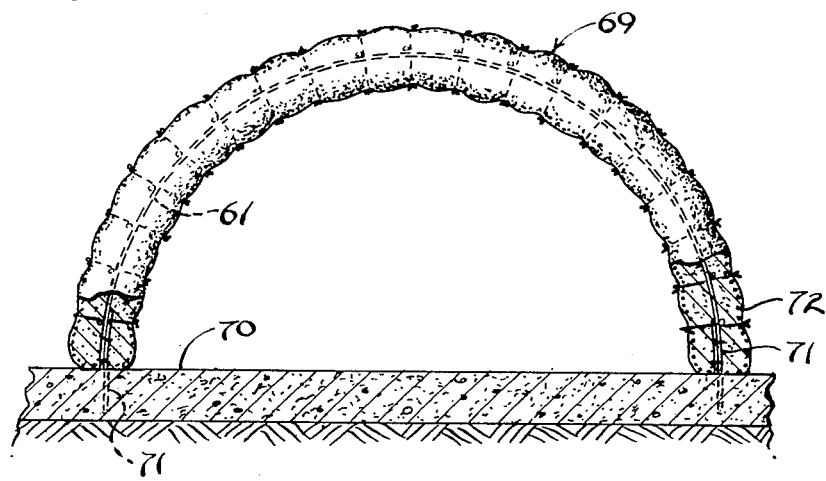
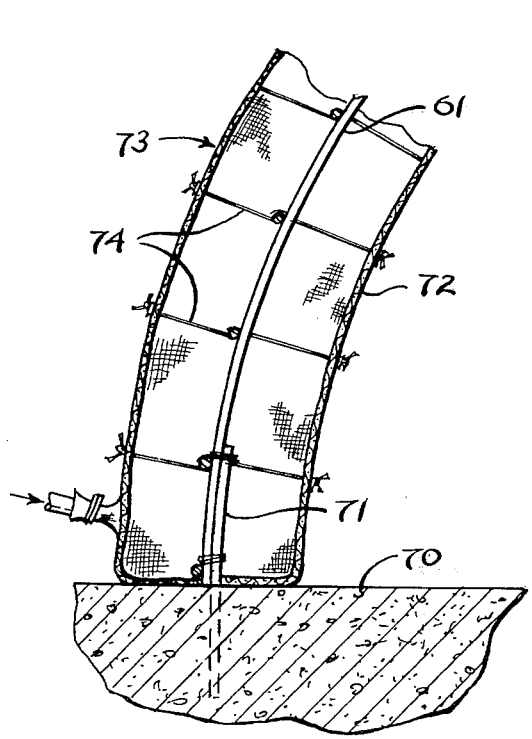
FIG. 33
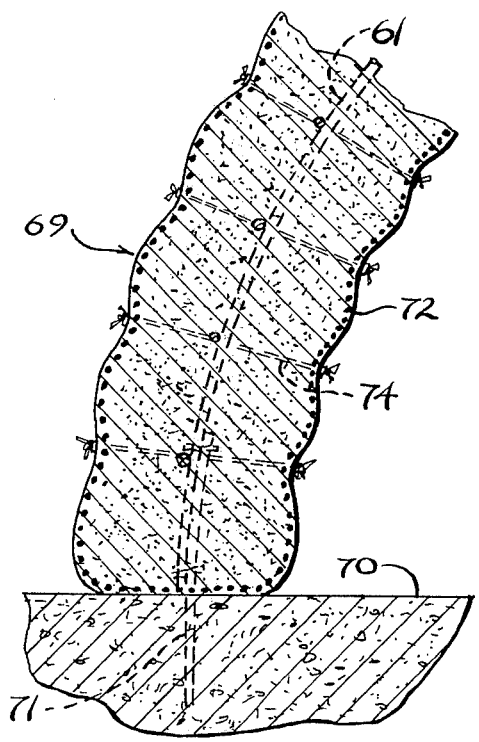
FIG. 34

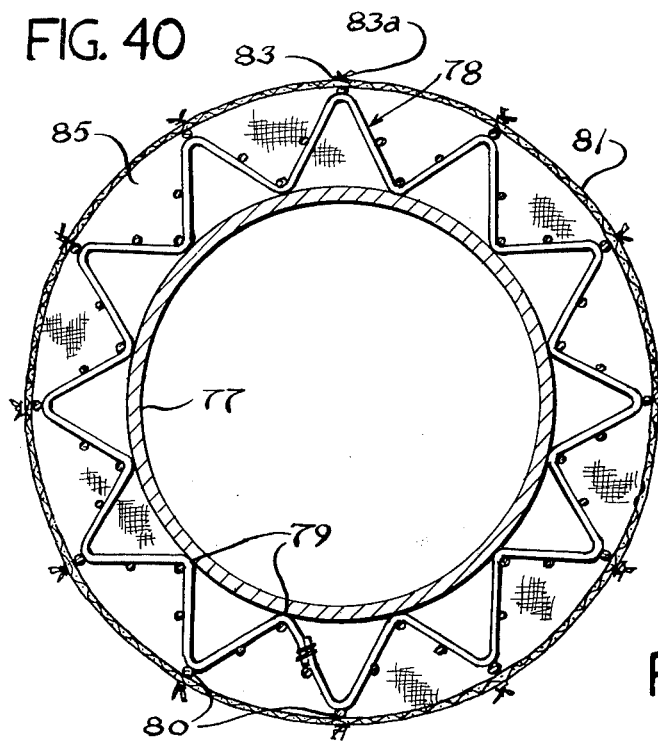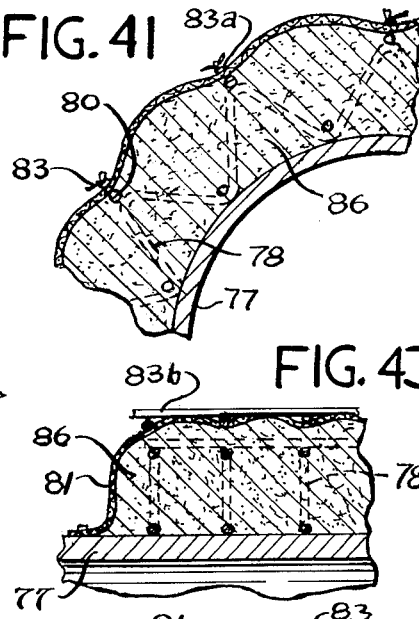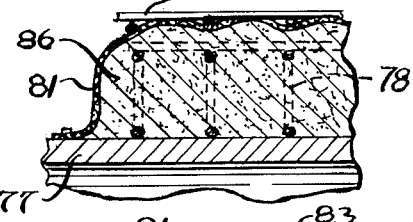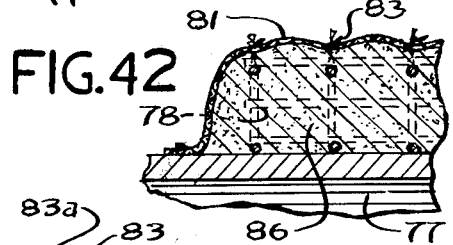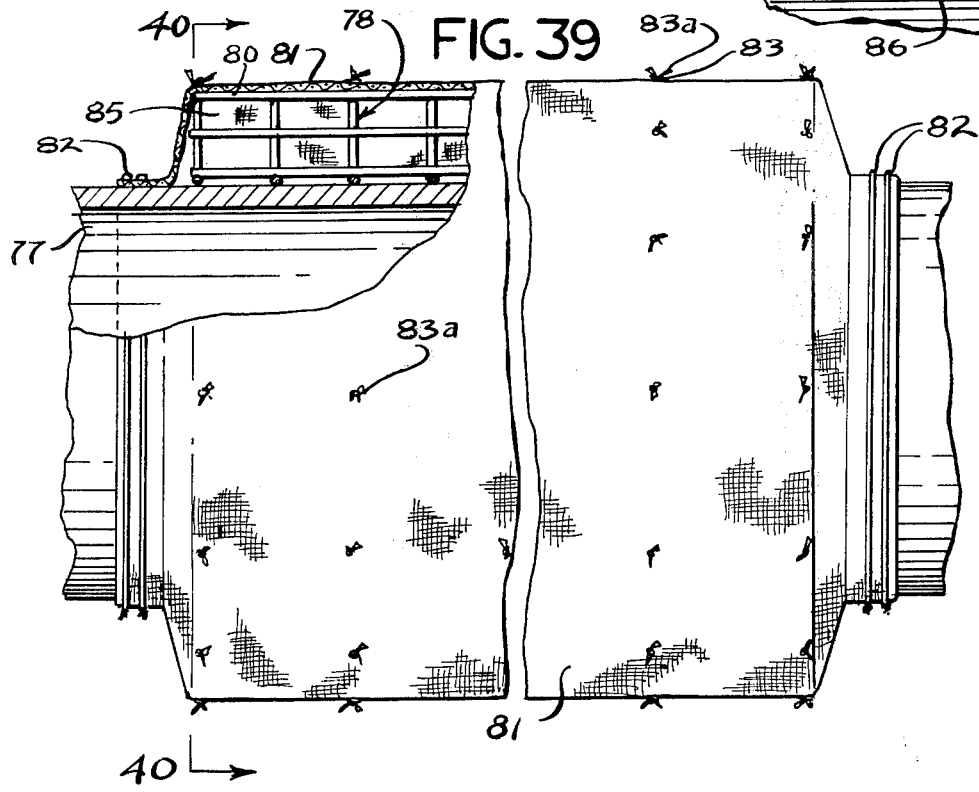

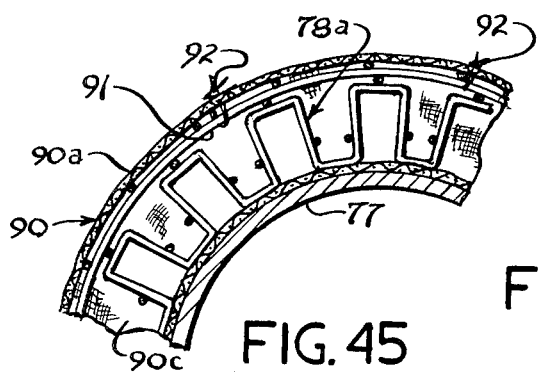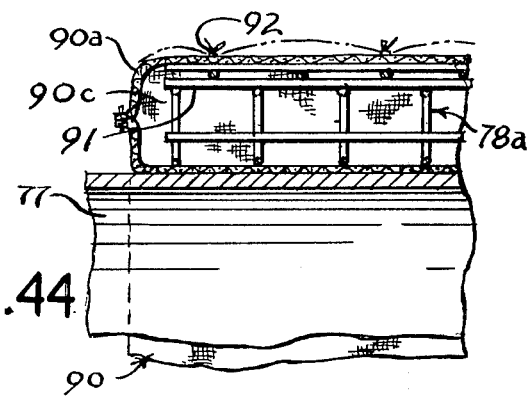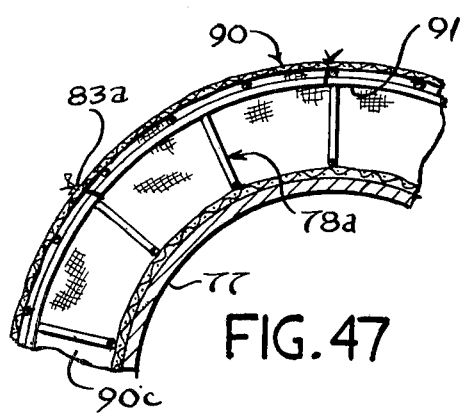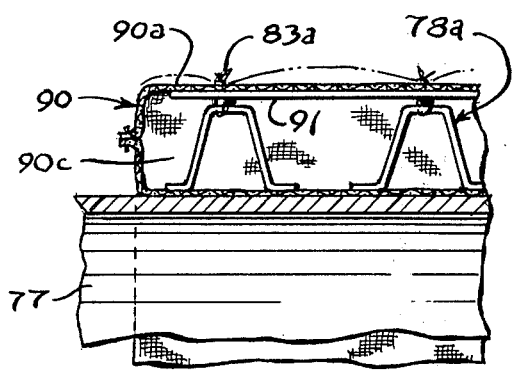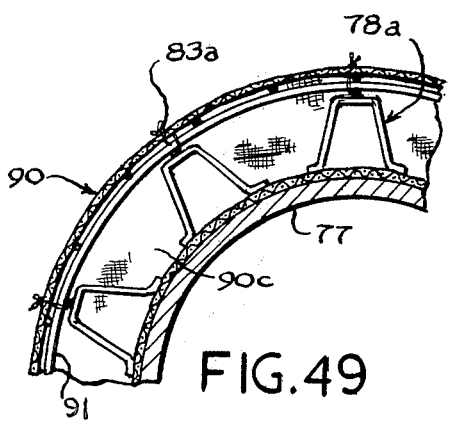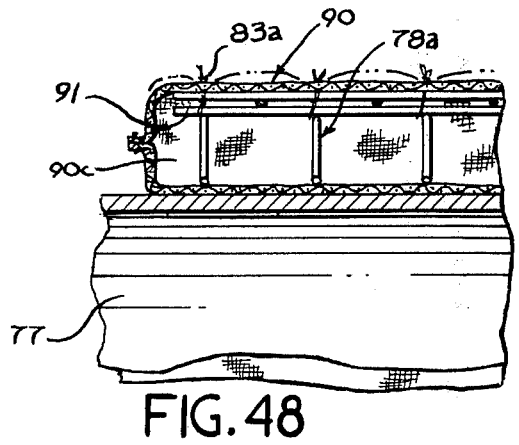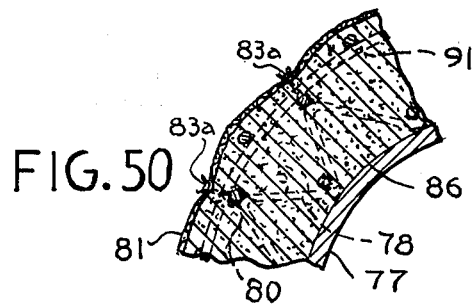

MEANS FOR PRODUCING SUBAQUEOUS AND OTHER CAST-IN-PLACE CONCRETE STRUCTURES IN SITU

CROSS-REFERENCE TO RELATED APPLICATIONS

This application is a divisional of U.S. Pat. application Ser. No. 542,050, filed Jan. 17, 1975, which is a divisional of U.S. application Ser. No. 44, filed Jan. 24, 1970, now U.S. Pat. No. 3,726,950, granted Apr. 10, 1973, which is a continuation-in-part of U.S. application Ser. No. 647,026, filed June 19, 1967, now abandoned, which is a continuation-in-part of U.S. application Ser. No. 365,431, filed May 6, 1964, now U.S. Pat. No. 3,345,824.

BACKGROUND OF THE INVENTION

In the past, concrete columns, bridge uprights, walls and the like, have been formed in situ by erecting complicated concrete-confining frameworks or forms, as by nailing or bolting wood or metal sheeting and/or boards onto vertical wooden posts or two-by-fours or wales, which sometimes required additional angular bracing means. Such frameworks were expensive to provide because of the high material and labor costs. Moreover, due to the closed nature of such wood and metal frameworks, the work of filling the framework with fluid concrete could not be visually observed, and hence the results were not apparent until the frameworks were removed. In addition, it was particularly difficult, if not impossible, in some instances to utilize wood and metal sheeting subaqueously.

SUMMARY OF THE INVENTION

This invention relates to grouting and concreting in situ, and in particular relates to improved means for making and/or repairing structural bodies in a situs without use of expensive temporary forms, or expensive labor and equipment to erect the same. For reasons to be described later, the improved means have been found to have particularly advantageous utility for producing walled structures of varying sizes and shapes, such as breakwaters, cofferdams, sheet-piling, and the like, under conditions which rendered prior means unfeasible or impractical. In several forms of the invention, the improved means is utilized by erecting or providing in situ a fixed matrix means at least portions of which include heavy, openwork wire mesh material so relatively fixedly constituted that the matrix means will remain substantially immovable against heavy pressure; pumping hydraulic cement mortar or grout, under pressure, into porous walled bag means, so that bag walls positioned adjacent the matrix are expanded against the backing of the fixedly maintained wire mesh matrix and further distended into the meshes of the matrix. The pressure may be continued until a small fraction of the flowable grout from within the bag means oozes through the porous walls. Thereafter the flowable mortar or grout within the porous bag means is allowed to solidify in pressure contact with the opposing portions of the matrix means.

The invention may take several forms. The form of invention shown in FIGS. 1 to 3, for example, utilizes a cylindrical wire matrix maintained affixed between the bottom of a wall or column and a supportive surface prepared in the earth below the wall or column, and a closed porous bag is suitably retained within the fixed matrix. When the concrete becomes sufficiently hardended the matrix may be removed (see FIG. 3).

FIGS. 4 to 7, and 35 to 36 show means for repairing concrete or wood piling or posts which have been eaten away by water erosion, or by known types of worms, for example. This means is as described for FIGS. 1 to 3, except that a tubular wire mesh matrix and tubular bag means or sleeves are affixed to the damaged pile as shown in FIG. 4, and mortar or grout is pumped in as before to produce the sturdy repair structure shown in FIGS. 6 and 7.

Another important form of invention, shown in FIGS. 8 to 12, employs a more elaborate matrix (single and/or double) of square-woven mesh wire, held rigidly affixed to resist opposing bag pressure, by means of uprights or heavy duty pipes and suitable tie wires or other tension-restraining means. This means is designed to produce more elaborate, dense concrete structures of various shapes, such as walls, cofferdams, and the like, without requiring the usual elaborate and expensive forms of sheet-piling, constructed above or below water level.

FIGS. 13 to 24, and 35 to 38 show further modifications of the invention employing the basic features of the porous fabric bag or container means as before, but using open-topped bag means of any size or capacity, enclosed within fixedly maintained wire mesh matrix means.

FIGS. 24 to 34 are respresentative of further modifications of the invention, utilizing the openwork matrix invention, but with a very important difference in that the porous fabric bag means, while taking the form of open-topped bags or containers of any size, shape, or extent, are supported by fixedly maintained openwork matrix means within the bag means and connected to the bag walls in a manner which controls the expanded shape of the body formed by the bag means.

FIGS. 39 to 49 show further use of the openwork, bag shaping matrix idea for applying a concrete wall about an existing metal or concrete pipe.

A general object of the present invention is to provide improved economical means for making concrete bodies of given size and shape in a subaqueous or other situs by which the progress and results may be visibly observed at all times, and controlled accordingly. Some, if not all, forms of the invention disclosed herein are particularly useful for under-water installations, such as breakwaters because forming matrices thereof are capable of withstanding rough seas or storm waves without damage during the construction process, and because the fluid cement mortar pumping operations are possible in a minimum of time when rough water conditions subside.

Other objects of the invention will be manifest from the following brief description and the accompanying drawings

BRIEF DESCRIPTION OF THE DRAWINGS

In the annexed drawings:

FIG. 1 is a vertical cross-section, partly broken away, through an under-water excavation in an earth situs, and an existing concrete wall or other like structure, illustrating a preliminary step in the method of providing a concrete supporting column between the bottom of the existing structure and the earth at the bottom of the cavity formed in the situs, for repairing or reinforcing the support for the existing structure.

FIG. 2 is an enlarged view corresponding to FIG. 1, partly broken away and in section, and showing completion of the reinforcing column made by the improved concreting method.

FIG. 3 is a view corresponding to FIG. 2, illustrating the completed concrete reinforcing column after removal of a wire-mesh matrix from the same.

FIG. 10 is a fragmentary front elevation of the wall as shown in FIG. 9, but with the matrix means removed.

FIG. 11 is a vertical cross-section, partly broken away, taken substantially on the line 11, 11 of FIG. 10, on the same scale, and illustrating provision of built-in anchoring means for a portion of the wall structure.

FIG. 12 is a fragmentary view corresponding to a portion of FIG. 10, partly broken and in section, illustrating another adaptation of the method invention for building a walled enclosure next to an existing wall.

FIG. 13 is a vertical cross-section through an earth situs along an eroded bank of a lake or other body of water, and illustrating installation of a double-walled wire-mesh matrix for use in a modified method and means for use in another modification of the invention for under-water construction of a concrete breakwater.

FIG. 14 is a top plan view, on an enlarged scale, taken substantially on the line 14, 14 of FIG. 13, and partly broken away.

FIG. 25 is a front elevation, partly broken away and corresponding generally to FIG. 8, of a modified form of matrix and bag means supported thereby in an earth excavation along a shore-line, for constructing a concrete retaining wall without use of temporary wood panels and walls.

FIG. 26 is a vertical cross-section taken substantially on the line 26, 26 of FIG. 25.

FIGS. 27 and 28 are views corresponding to FIGS. 25 and 26, respectively, illustrating completion of the modified method to produce a concrete wall structure of given shape and size.

FIG. 32 is a fragmentary vertical cross-section corresponding in part to FIG. 29, illustrating the same method as used for making curvate sheet-piling, but for producing an arched concrete culvert wall on a reinforced concrete slab.

FIGS. 33 and 34, respectively, are enlarged fragmentary views corresponding to the left-hand portion of FIG. 32, illustrating the forming means and the finished concrete structure formed thereby, respectively.

FIG. 4a is a fragmentary view corresponding to the lower portion of FIG. 4, but greatly enlarged and broken away to show more clearly the manner of affixing the bag means and matrix means to the existing structure.

FIG. 39 is a side elevation, partly broken away and in cross-section to illustrate a modified method and means for forming a cast-in-place concrete repair section of any given length and thickness on a large pipe in situ.

FIG. 40 is a vertical cross-section taken substantially on the line 40, 40 of FIG. 39.

FIG. 41 is a fragmentary cross-section corresponding to a portion of FIG. 40, after hardenable cement mortar has been pumped into the cavity defined by the matrix-restrained structure forming bag or container wall.

FIG. 42 is a fragmentary cross-section of the upper left-hand portion of FIG. 39, but in the same structural condition as indicated in FIG. 41.

FIG. 43 is a view like FIG. 42, but showing the bag wall restrained to given limit by a cylindrical length of mesh material connected to fixed matrix means by tie elements.

FIGS. 44 and 45, 46, 47, and 48 and 49 are three groups of two fragmentary cross-sections, each corresponding to portions of FIGS. 39 and 40, illustrating further modified methods and means for repairing pipes in situ.

FIG. 50 shows a modification of the formed structure showin in FIG. 41.

DESCRIPTION OF THE PREFERRED EMBODIMENTS

Figure 4:
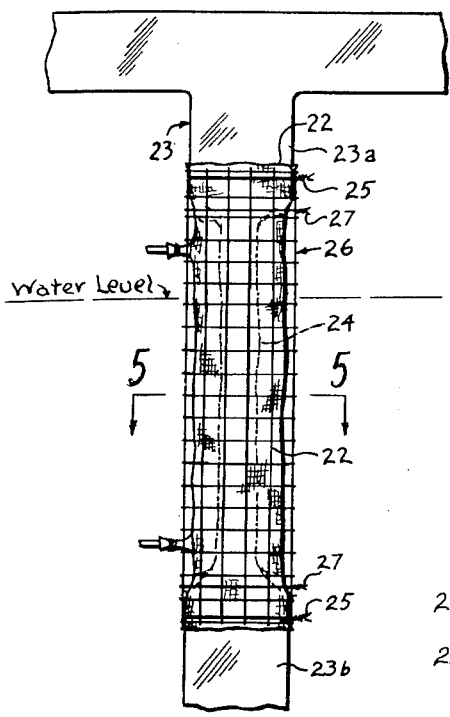
FIG. 4 is a view corresponding to FIG. 1, on the same scale, illustrating a modified form of the method invention utilized to repair an existing bridge or like supporting column which has been damaged by erosion or by being otherwise partially eaten away.

Referring to FIGS. 1, 2, and 3, in general, and to FIG. 1 in particular, there is illustrated a typical below ground and water level condition in which a dam, bridge, upright wall or other concrete structure W supported on or in an earth situs has been seriously damaged by water erosion, and requires supporting reinforcement. FIG. 1 shows a cavity 15 made in the earth situs E to expose a substantial area of the bottom surface 16 of the existing wall W in vertically spaced relation to a suitably firmed floor F at the bottom of the cavity, and FIG. 3 shows a concrete column 17 solidly installed, by one form of the method of the invention, between an excavated earth floor F and the exposed bottom 16 of wall W for reinforcing the support of the latter.

Referring to FIG. 1, in particular, the method of the invention includes provision of an elongated tubular matrix 18 of openwork sheet material, and of approximately the required cross-sectional size or girth of the required reinforcing column 17 to be formed in situ (see FIG. 3). The matrix may, for purposes to be described later, be provided by rolling and/or bending a sheet of strong, heavy gauge, square mesh, wire fence material and fastening overlapped edges together with tie wires, tensionally to resist outward expansion of the matrix in known manner.

The formed matrix 18, with a closed, elongated bag 19 of predetermined size and shape made of burlap or other porous-walled flexible fabric contained therein, is securely affixed or maintained in vertical upright condition between the bottom face 16 of wall W and the earth floor F (see FIG. 1). The two ends of the matrix may be rigidly affixed or tensionally restrained against outward expansion of the mesh material, as by means of stakes or spikes 20, 20 or other means in the wall W and the earth floor F. In the situation where the matrix is of tubular shape, for forming a concrete post 17, of generally cylindrical shape, for example, the openwork material and/or construction can be designed so that the matrix can stand upright without spikes or other fastening means. In other words, the wire frame 17 can be self-supporting on a surface tensionally to resist outward expansion forces from within, equally in all radial direction without being anchored.

The bag 19 initially may be loosely supported in vertically extended condition within the fixedly maintained matrix, as shown in FIG. 1, as by means of short tie wires 21, 21 extended through the bag wall and twisted about wire portions of the matrix (FIG. 1), or otherwise as described. A suitable mesh size for the matrix 18 would be on the order of four of five inches square, as an example, but could vary considerably depending on the size of the column to be produced and the gauge of wire used in the matrix (see FIG. 2). Fabric material suitable for the bag means may be of various woven types having a substantial range of requisite mesh sizes for allowing fluid grout to pass therethrough to a limited degree, as necessary for purposes to be described later.

With the matrix affixed or otherwise firmly maintained as described, and as shown in FIG. 1, pressurized fluid cement grout or mortar from a source not shown is pumped into the bag 19 through suitable conduit means 19a, to expand the porous bag walls in all directions against the inwardly confining tensional restraint of the tubular matrix 18, the wall surface 16, and the earth floor F, and is further expanded against the resistance of the criss-crossed wires of the matrix until the corresponding portions of the bag walls are distended and bulged outwardly through the square meshes of the matrix. As all this may be clearly visible to workmen practicing the method, they are able to observe when the column is fully formed substantially as shown in FIG. 2, and to continue grout-pumping operations until a relatively small fraction of grout within the bag oozes out through the porous walls thereof to form a protective layering or coating of oozed-out grout over the surfaces of the expanded bag 19, according to the grout pressure applied. Oozed-out grout at the upper and lower ends of the bag serve to bond said ends of the formed body to wall W and earth floor F, respectively, upon solidification of the grout in known manner, as shown in FIG. 2.

Upon such solidification of the concrete column 17, the entire wire mesh matrix 18 easily may be removed from the column, as shown in FIG. 3, to expose a uniform pattern of outwardly protruding concrete portions 17a, formed by distension of the porous bag walls in the manner described above. If desired or necessary, the cavity E may be filled in around the completed column 17 with earth or other filler material.

Referring to FIGS. 4 to 7 and 4a, there is illustrated a modification of the method invention described in connection with FIGS. 1 to 3, for repairing a concrete column or pile 23, of a pier, or a bridge, for example, which has been partly eroded away and seriously weakened at 24, as by action of water over a long period of time.

In this instance, as shown in FIG. 4, burlap or other porous fabric is suitably assembled and stitched to have requisite tubular shape about the damaged section of the column, and the ends of the formed sleeve-like bag means are anchored to said upper and lower undamaged portions 23a and 23b of the column, as by means of wire windings 25, 25 in a manner to seal the bag ends against outward passage of pressurized grout in a subsequent grout pumping step of the method.

Figure 5:
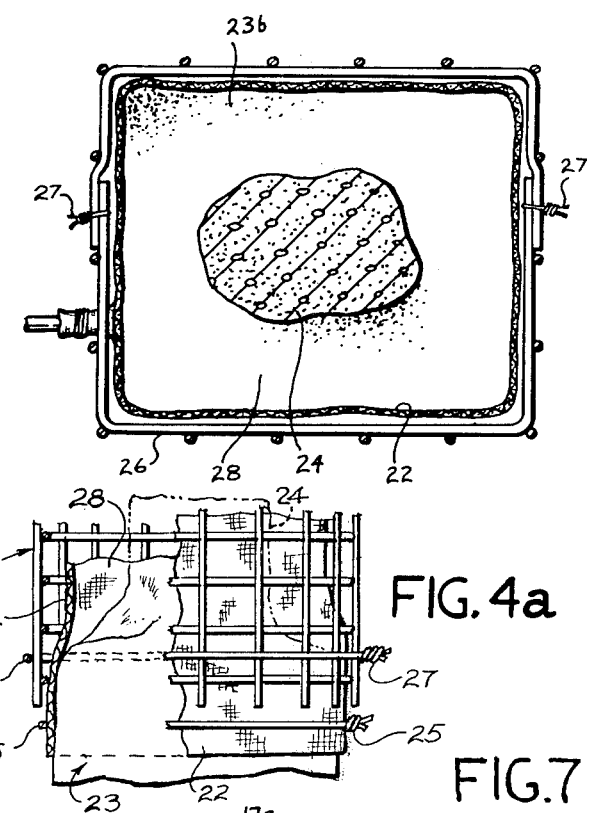
FIG. 5 is an enlarged horizontal cross-section taken substantially on line 5, 5 of FIG. 4.

Next, an elongated square-mesh, woven wire matrix 26 is suitably anchored to the column or pile portions 23a and 23b, as shown in FIGS. 4 and 5, as by wire windings 27, 27 about said portions. If desired, especially if the column 23 is of square cross-section, the matrix 26 may be formed as two channel-shaped sections suitably joined and wired, or otherwise secured together, to restrict or tensionally restrain outward expansion of the sleeve-like bag walls, as before.

Figure 6:
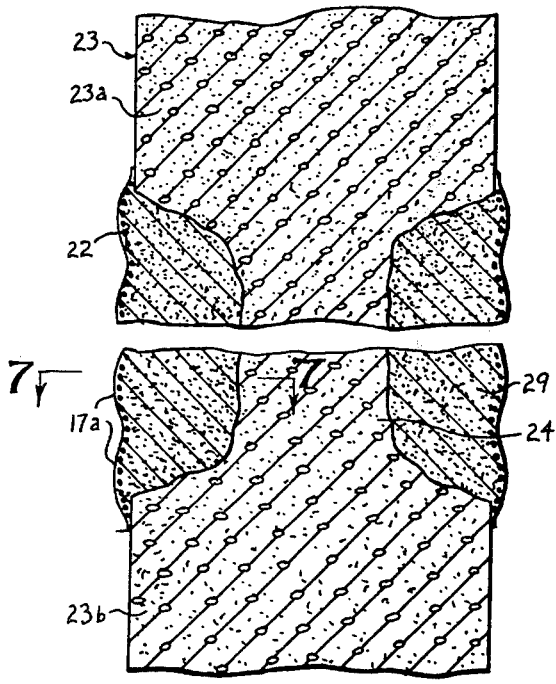
FIG. 6 is an enlarged fragmentary vertical cross-section of the structure shown in FIG. 3, but illustrating the completed column made by the improved method with use of the matrix and bag means illustrated in FIGS. 4 and 5.
Figure 7:
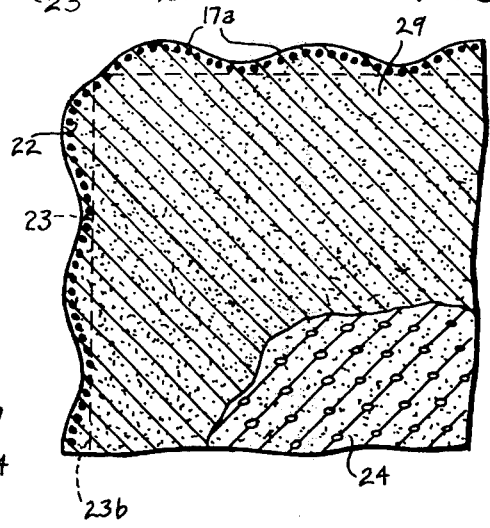
FIG. 7 is a further enlarged fragmentary cross-section taken substantially on the line 7, 7 of FIG. 6.

Fluid cement grout or mortar, under pressure, is now pumped into the porous-walled bag 22 as before to fill the space 28 around the damaged pile (see FIG. 5), first to expand the bag walls against the tension-resistant body-forming walls of the matrix 26 and distend portions of the bag walls through the meshes of the matrix to limited extent calculated to ooze grout through the porous walls of the bag to requisite degree, as described above for FIGS. 1 to 3. Upon solidification of the self-hardening grout, the resultantly formed strong, durable concrete body 29 is securely bonded directly to the eroded portions of the pile, as shown in FIGS. 6 and 7. As before, the wire mesh matrix 26 may then be removed from the solidified pile repair body or section 29.

In a situation in which a section of a pile, as shown in FIGS. 4 to 7, has to be removed completely, a closed bag like that in FIGS. 1 to 3 may be used in place of the sleeve-like bag of FIGS. 4 to 7, in combination with the matrix 26 of FIG. 4.

Figure 35:
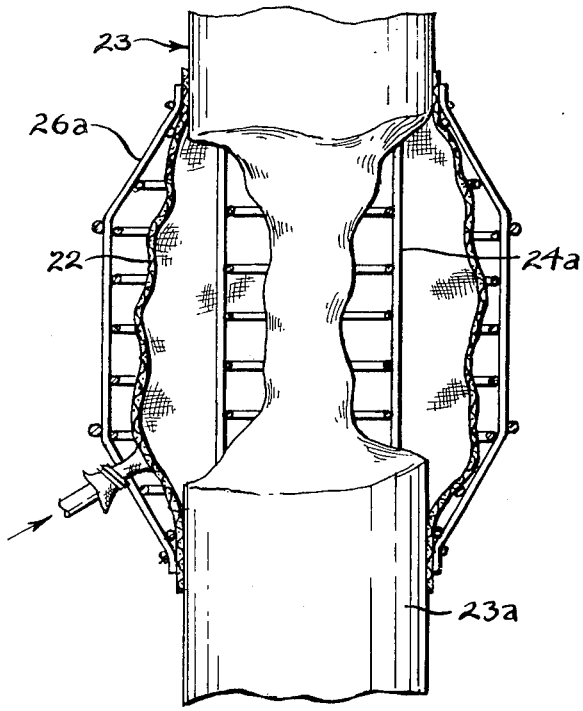
FIG. 35 is a view corresponding to FIG. 4, but greatly enlarged and partly in cross-section, and showing how the FIG. 4 forming means is shaped and arranged for producing a different, enlarged repair section of circular cross-section.
Figure 36:
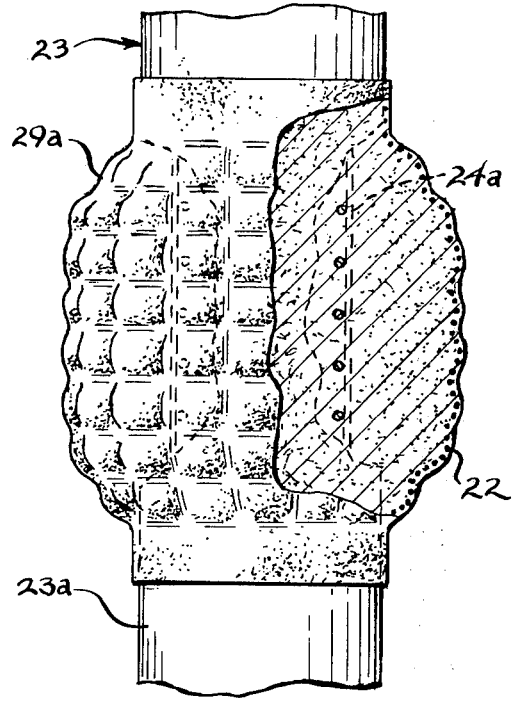
FIG. 36 corresponds to FIG. 6, but shows the bulbous concrete repair section formed by the forming means of FIG. 35.

The method generally as described above in connection with FIGS. 4 to 7, and 4a, is further amplified in FIGS. 35 and 36 to illustrate use of the porous fabric sleeve and fixed openwork matrix combination, to form a concrete repair section 29a, bonded to the column as before, but with a different, selectively enlarged shape as shown, for greater strength. Like parts have been given like numerals unless otherwise noted. A metal cage 24a easily may be included to reinforce the added repair section 29a as necessary.

Referring to FIGS. 8 to 11, there is illustrated another modification of the method invention for economically building a unitary concrete wall structure 30, such as an outdoor oil-draining pit for vehicles, or a water-retaining wall, such as a cofferdam.

For making continuous wall 30, as for an oil-draining pit, the earth situs E is excavated as necessary to provide a suitable flat, substantially solid surface area S, and series of sturdy uprights or anchor pipes 31, 31 are driven into the earth more or less in pairs from the surface S, to extend vertically and rigidly therefrom, and substantially defining the cross-sectional shape and size of the desired continuous wall. Secured to the inner portions of the uprights 31, as by means of tension-resistant tie wires 31a, 31a, may be continuous, openwork matrix walls 32, 32 in the form of square-mesh fencing material, to extend in spaced apart parallel relationship, generally to define a body-forming cavity therebetween for the desired thickness of the wall. For this purpose the resultant mesh wire matrix 33, may be open at the top and extended somewhat higher than the desired height of the wall.

Closed, elongated, porous-walled bags 34, 34 are now progressively inserted downwardly one upon another within the continuous space between the mesh wire matrix walls 32, and each bag is progressively expanded in all directions by pumping fluid cement grout into the same to expand the flexible walls thereof into pressure-resisting engagement with the opposing said tension-resistant mesh wire walls 32, until opposite sides of the bags bulge through the meshes as described above for FIGS. 1 to 7, and further a relatively small fraction of grout oozes out to coat the bag surfaces. The bags are built up as described, one upon the other, progressively and in overlapping relationship, generally as shown in FIG. 9, as rapidly as possible while the grout in each bag is in pliable condition, to accomplish the aforementioned outward bulging action uninformly against the tensional restraint of the respective opposing matrix walls 32, as well as to accomplish a substantially uniform degree of block-like shaping of the grout-filled bags as the bag build-up progresses.

Figure 8:
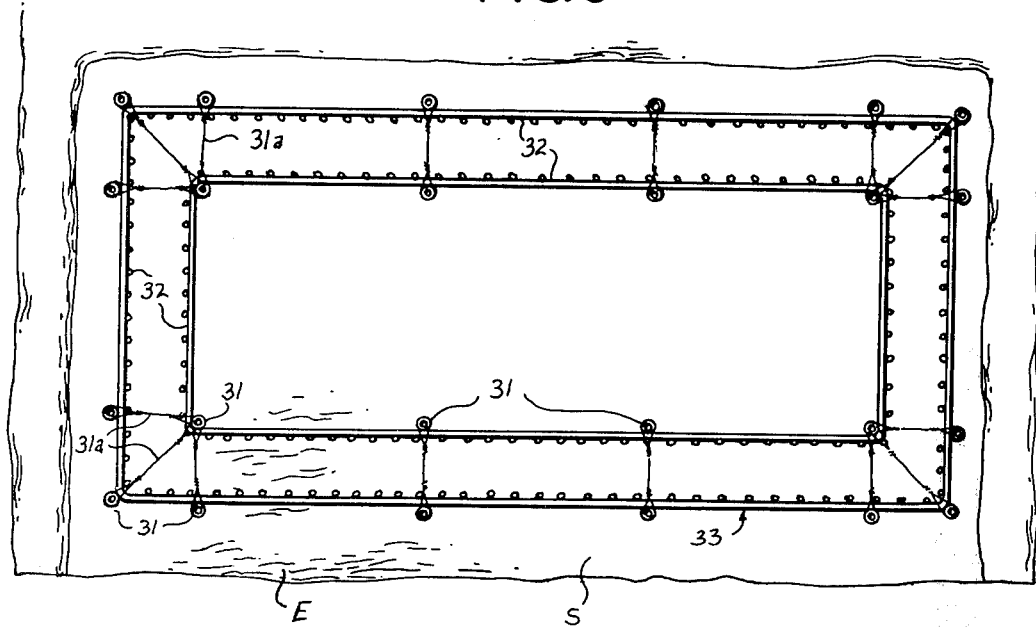
FIG. 8 is a top plan view illustrating installation of mesh wire matrix means in a situs for utilizing the method of the invention to build a concrete wall structure, as for use as a vehicle oil draining pit, or a cofferdam.
Figure 9:
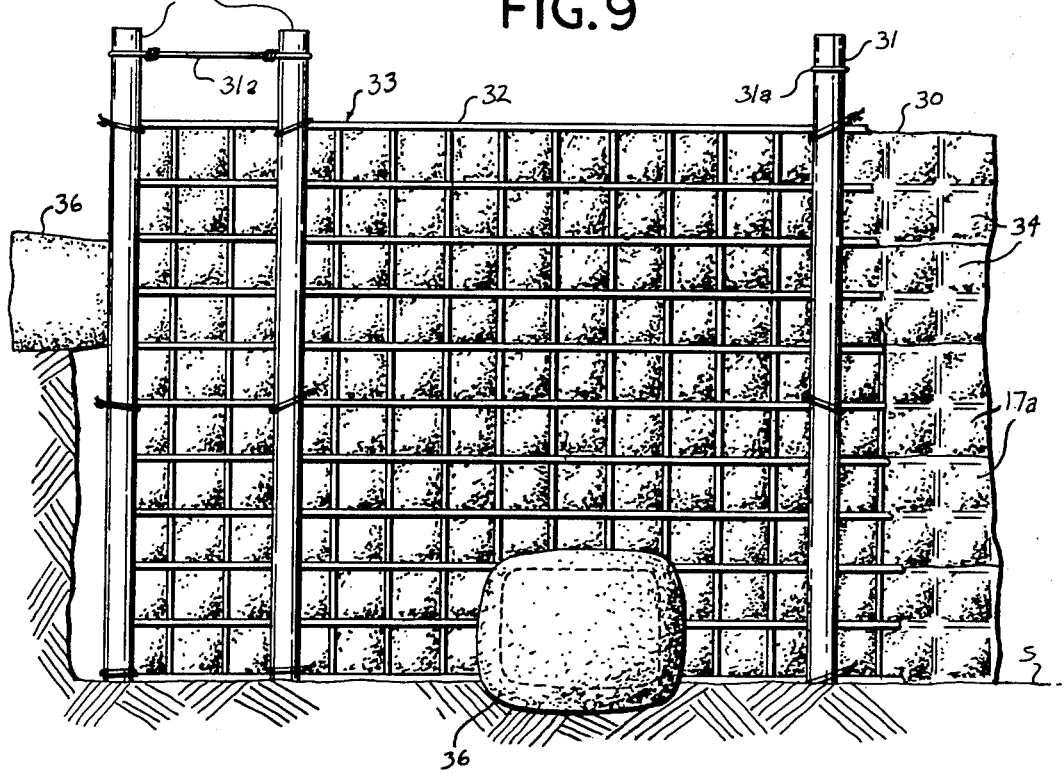
FIG. 9 is an enlarged front elevation of a portion of FIG. 8, partly broken away, and illustrating the wall structure in completed condition but with the wall-forming matrix means retained in place.

The tie wires 31a tensionally restrain the spaced matrix walls against possible separation thereof as the bag build-up progresses (see FIGS. 8 and 9). The wall being formed otherwise may be reinforced, where necessary, by occasional inclusion of an elongated porous-walled bag 36, laid and expanded as before, except that it is extended laterally outwardly of one side of the wall to be suitably embedded in earth or other fill material subsequently piled around the wall. For this purpose the outwardly extended end of the solidified wall-anchoring bag 36 may have an enlargement 36a, as shown in FIGS. 9, 10, and 11.

Upon completion of the resultant composite wall, as shown in FIG. 9, the openwork matrix may be removed to provide a solidified, composite wall 30 substantially as shown in FIGS. 10 and 11. The solidified bags or blocks are effectively bonded to each other by amalgamation of the oozed out grout from the adjacent bag walls, which also serves to make the wall reasonably watertight.

FIG. 12 shows a modified wall structure produced by the method described except that one face thereof is formed directly against an existing concrete wall or other existing structure in the situs.

It is readily apparent that the method invention described above, in the several forms thereof, may be practiced with use of expansible bags which are not porous-walled. With use of porous bags, however, the oozed-out grout forms coatings of hardneable cement which upon solidification bonds the bags to each other and to any other surfaces contacted thereby during the grout-injecting procedure. It is also readily apparent that the method provides a way to make concrete original or repair bodies of various predetermined shapes and sizes or proportions with simple, easy to install forming means, and in a way by which the body-forming process can be observed through the wire mesh matrix material to control expulsion of water through the fabric until a proper water-cement ratio is attained as indicated by the amount of grout oozed through the pores. On the other hand, the use of the expanded porous bag procedure described makes possible the aforesaid continued expansion of the bags through meshes of the openwork matrices, to assure proper controlled extrusion of the grout through the pores of the bag walls for forming the highly effective bonding and protective cement coatings on the outer surfaces of the bag walls especially where the bag walls come into pressure contact with another surface.

Referring now to FIGS. 13 to 18 of the drawings, there is illustrated another form of the invention which has particular utility for economical production of cast-in-place concrete walls to prevent wave erosion along shores or banks of waterways, regardless of the types of existing earth materials at the situs. FIGS. 13 and 14 illustrated initial steps in this modified method for producing a cast-in-place breakwater B (see FIGS. 17 and 18) along a bank of a lake, which bank has become severely eroded by constant lashing of storm waves.

For this purpose, where a rough, rocky bottom location of the bank 40 presents a problem, such location may first be provided with a solid concrete base 41 which is formed to fill irregularities in the rough bottom, and to have a relatively flat top surface 42, as by use of the porous bag method disclosed in prior U. S. Pat. No. Re. 25,614. For carrying out the steps of the present method, however, progressive forming and hardening of the base 41 provides a convenient way in which to anchor series of spaced rigid metal stakes, pipes or rods 43, 43 therein, to extend vertically upward from the top surface 42 of the base to heights greater than the predetermined heights corresponding to top portions of the required breakwater, and to follow the outline of desired shape of the breakwater. Thus, as an initial step in the method now being described, as best shown in FIG. 14, the anchoring stakes 43 may be arranged to form an outline for a U-shaped breakwater or wall.

Openwork sheet material, such as strong square mesh wire 44, may now be suitably affixed to the stakes 43, in vertical relationship therewith, to form a horizontally U-shaped, vertical matrix enclosure wall 45, within which a correspondingly U-shaped, open-topped bag means or container 46, of open-mesh porous fabric, is maintained draped or suspended to substanial requisite depth as by means of wire tie-elements (not shown). Accordingly, the bag walls also will conform generally to a vertically U-shaped cross-section of the openwork matrix walls 44, 44, with the bottom wall of the bag means resting upon or adjacent to the base surface 42, as shown in chain-dotted lines in FIG. 14, and in full lines in FIG. 15. Tie wires 44a, 44a or other tension-resistant means may be extended between laterally spaced anchor rods 43 of the matrix walls 44, tensionally to resist outward distension of the laterally spaced mesh matrix walls 45, 45, applied by internal pressure within the bag means in a manner to be described later. Thus, when the bag means or container 46 is anchoringly supported to be fixedly held or contained by the opposing wire mesh matrix walls 45, operators following the present method then may pump fluid, hydraulic cement mortar into the open-topped bag means, to fill the fabric container with pressurized mortar, starting with a free end of at least one conduit 47 initially positioned near the bottom of the bag means 46 (see FIG. 15), and continuing said pumping until the fabric bag means is filled with fluid mortar 48 to predetermined level, as illustrated in FIG. 16. The pressure within the pumped mortar, combined with the increasing weight thereof, is effective to urge or expand the porous fabric container walls 46 into strong wall-shaping conformity with the tensionally restrained opposing matrix walls 45, or with other existing wall structures forming part of the matrix means, such as the hardened concrete base 41 or other fixed wall structure existing at the situs. As before, the fabric container walls expand into the openings of the openwork material as indicated at 49, 49 in FIG. 16, against said tensional restraint of the matrix walls, and pumping is controlled to attain a lower water-cement ratio, which may be manifested by oozing of mortar through the fabric pores, or otherwise.

The formed fluid-mortar body 48, is allowed progressively to set and harden into a solid wall 48a. When hardness has been accomplished the matrix means enclosure wall 45, including the uprights 43 may be removed, to leave the resultantly formed and hardened U-shaped breakwater section exposed as shown in part in FIGS. 17 and 18. In areas where a wall of the bag means is supported or otherwise maintained in contact with an opposing surface, such as with the surface of base 41, grout which has oozed through the porous fabric of the bag means 46, as described above will provide an excellent fluid-sealing bond between the contacting areas.

It should be readily apparent that a breakwater, or other types of walls, may be produced by the method described in connection with FIGS. 13 to 18 in many sizes, shapes, and proportions, and that additional wall sections, such as wave dispersing, transversely zig-zagging wall portions E, can be located at areas indicated in chain-dotted lines at the right of FIGS. 13 and 14, either by extension of the trough-like bag means 46 and coresponding matrix means, or by adding abutting segments of the forming means.

A very important feature of the method of FIGS. 13 to 18 is that, in addition to making possible a very substantial savings in costs for material, equipment, and labor, as compared with such costs in use of prior methods, is that the base 41 and matrix means can be constructed in the water of the situs, then if a severe storm stops the work substantially no damage will be done, because water can pass through the openwork matrix means. Accordingly, it has been found in actual practice that upon cessation of storm wave action the work of the method described can be continued at the point where the initial work left off. It is readily apparent that if such a project were being carried out by the prior methods utilizing lagging or sheeting of known types, the same would have been swept with the first storm waves, and new lagging or sheeting would be required, with very substantial additional expense for materials, equipment and labor.

Figure 19:
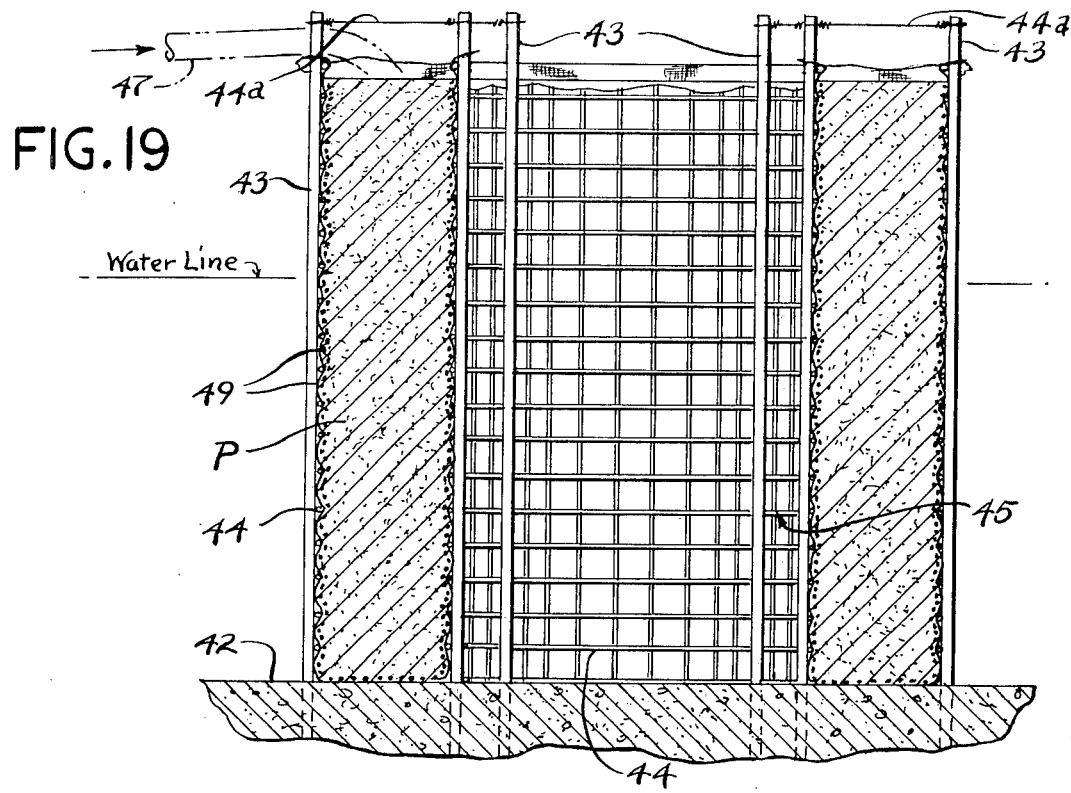
FIGS. 19 and 20 are views corresponding to FIGS. 16 and 17, respectively, illustrating use of the same method for forming pipelike structures.
Figure 20:
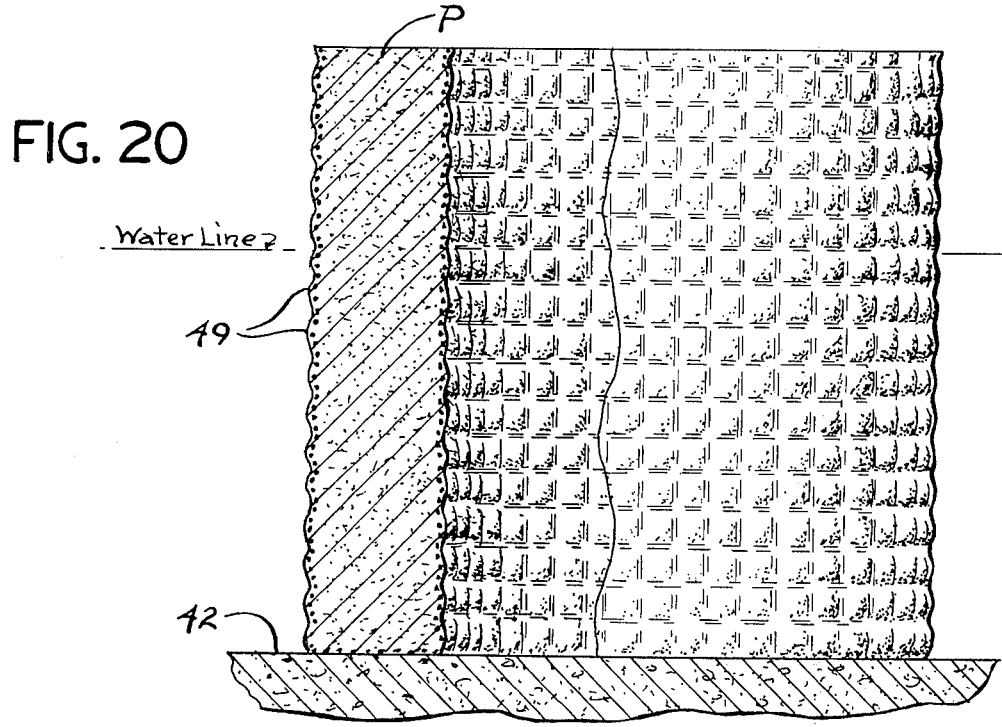

FIGS. 19 and 20 illustrate use of the general method described in connection with FIGS. 13 to 18, for producing large concrete pipes of pipe-like structures P, and which can be formed at the situs as shown in FIG. 20, for use in breaking up storm waves and retaining sand or like earth material therein. In FIG. 19, which corresponds generally to FIG. 15, like parts or structures have been given like numerals unless otherwise noted. It is self-evident, however, that tubular concrete pipes P or the like, within a very wide range of sizes, proportions, and wall thickness can be made in situ in the vertically upright relationship shown in FIG. 20, as for use at or near the situs, in horizontal or other angular positions, such as for use as a culvert under a road.

Figure 15:
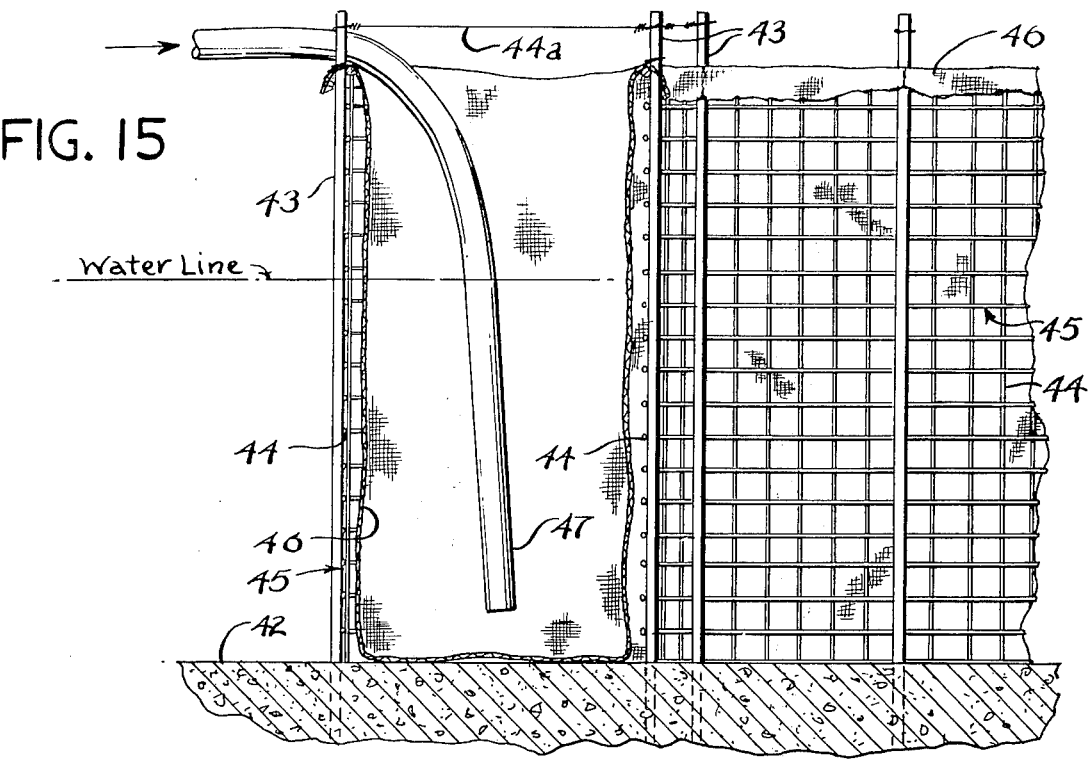
FIG. 15 is a vertical cross-section taken substantially on the line 15, 15 of FIG. 14, illustrating a further step in the method in which an open-topped openwork fabric container is suspended within the double-walled matrix.
Figure 16:
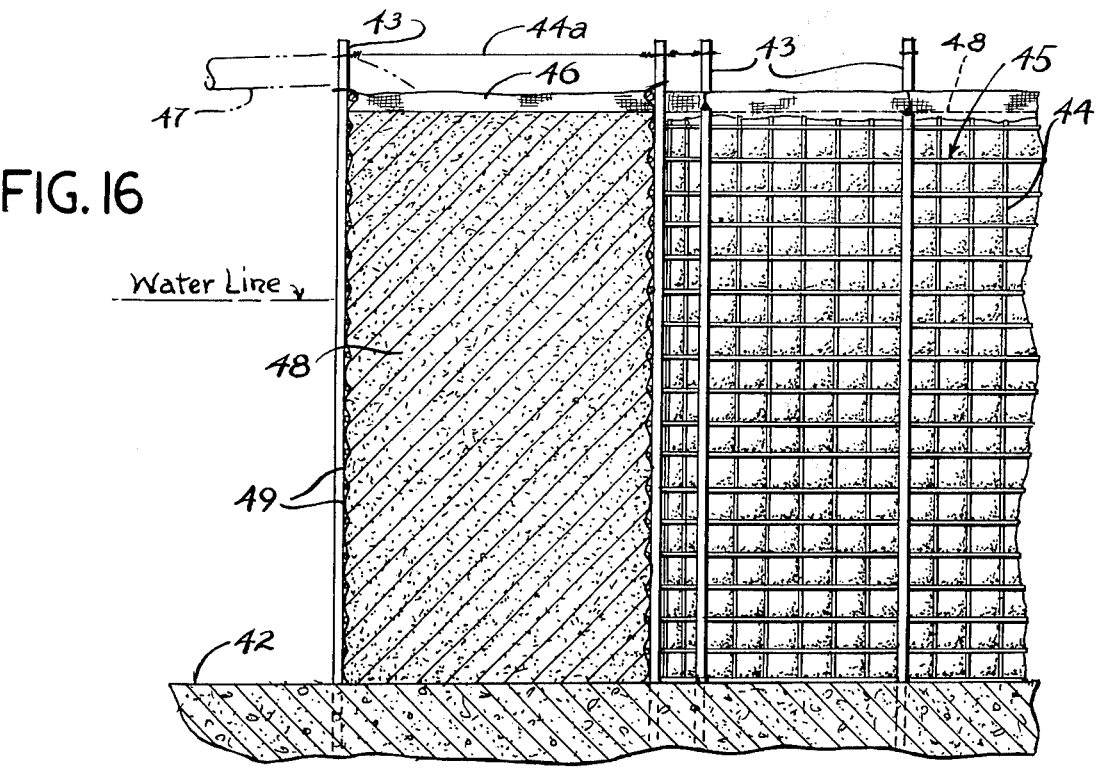
FIG. 16 is a view corresponding to FIG. 15, after pumping the fabric container with fluid mortar to expand the bag walls against the walls of the matrix.
Figure 17:
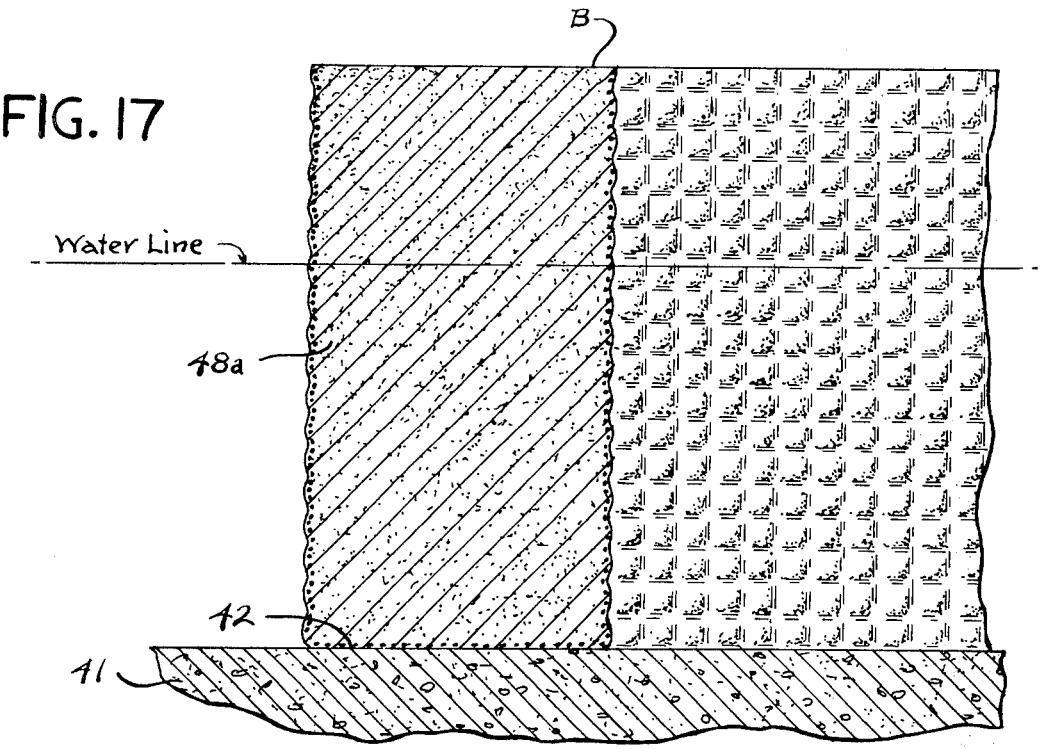
FIG. 17 is a view corresponding to FIG. 16, after removal of the matrix means from the formed and hardened concrete breakwater structure.
Figure 18:
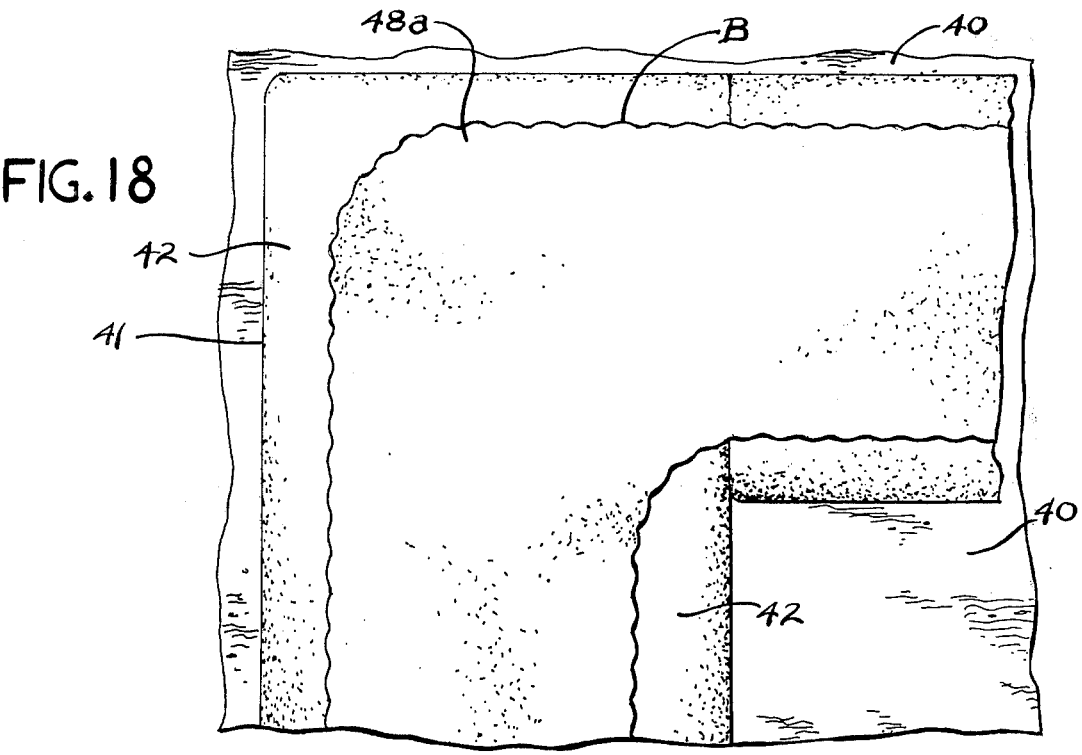
FIG. 18 is a top plan view of FIG. 17.
Figure 21:
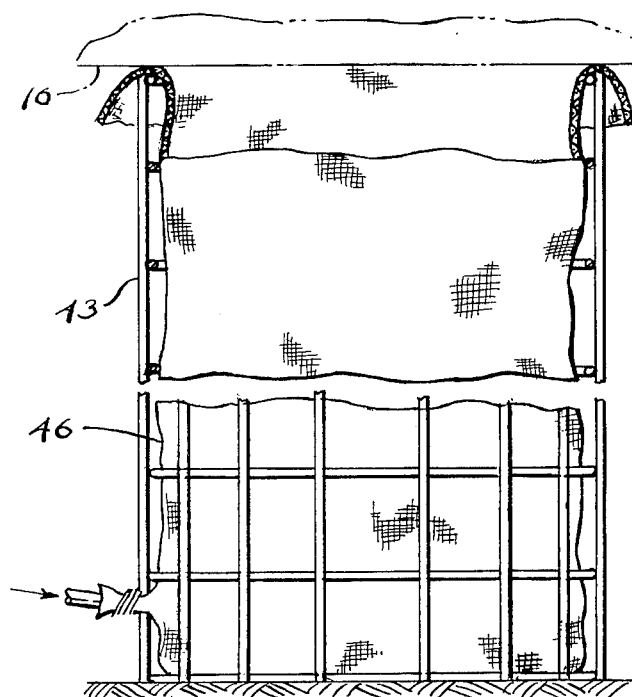
FIGS. 21 to 23 are views corresponding generally to FIGS. 15 to 17, illustrating use of the same open-topped bag method for forming a solid concrete upright or post.
Figure 22:
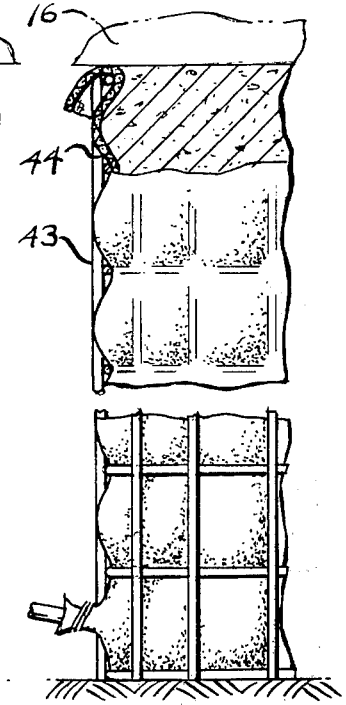
Figure 23:
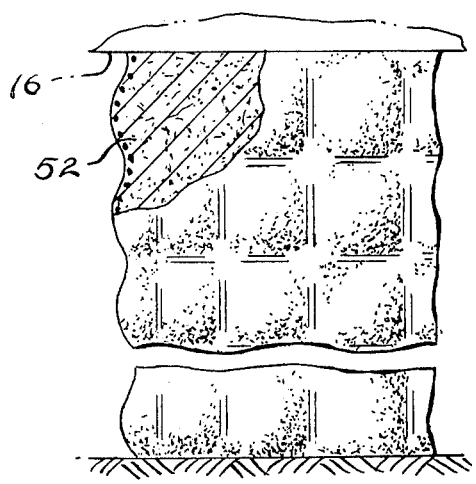

FIGS. 21, 22, and 23, correspond generally to FIGS. 15, 16, and 17, respectively, and show use of the same open-topped bag method to produce a solid concrete column 52, as shown in FIG. 23, which can extend freely upright as shown or can be formed as a supporting column between the surface of an earth situs and the bottom wall 16 of an existing structure, which then serves as a wall of the matrix, substantially as shown in FIGS. 1 to 3. As before, like numerals in FIGS. 21 to 23, refer to like numerals found in FIGS. 15 to 17, unless otherwise noted.

Figure 24:
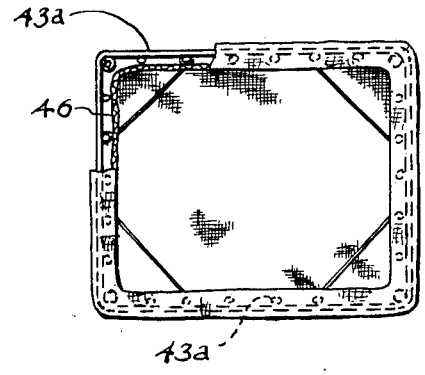
FIG. 24 is a top plan view of FIG. 21, but illustrating the matrix as being of squared or rectangular cross-section, and having corner tie-wires for retaining the squared shape of the matrix under expansion pressure of the bag.

FIG. 24 is a top plan view of FIG. 21, but on a reduced scale, and modified to show an openwork matrix 43a of square cross-section, suitably braced at the corners by suitable tie-elements, to hold the squared shape and equalize the tensional resistance of the matrix walls to the expansion of the bag walls against the same.

It is to be noted that in all forms of the invention illustrated in FIGS. 1 to 24, the structure-forming walls of the various types of matrix means are vertically disposed on supporting surfaces, and have areas of openwork matrix walls anchored or otherwise maintained affixed, for uniform tensional resistance to fluid-pressure distension of the walls of the porous fabric bag means.

A further modified means of the invention is exemplified in FIGS. 25 to 28, which utilizes an open-topped, porous fabric bag means 55 supported by a rigidly maintained upright, shape-controlling matrix means in the form of an openwork or mesh wire grid 56.

Referring first to FIGS. 25 and 26, the modified means for forming a concrete wall structure involves first providing an open-topped porous fabric bag 55 of requisite rectangular shape, size and thickness, with the rectangular grid 56 centrally positioned between uniformly spaced bag walls 55a, 55a. The matrix grid combination may be rigidly maintained in upright condition at the situs by anchoring projection of rigid rod extensions 59a on the grid into the earth of the situs, as best shown in dotted lines. Additional anchor rods 59b, 59b may be extended from the grid into the earth at various angles, as required for fixedly maintaining the grid in vertical position for purposes to be described. Before or after thus rigidly positioning the matrix grid, depending upon working conditions, a multiplicity of uniformly spaced wire or other tension-restraining tie-elements 60, 60 may be anchoringly attached to the grid to have opposite end extensions 60a of each element projected through the opposing bag walls 55a. The extensions 60a may have selectively located stop means 60b thereon, for limiting subsequent outward expansion or distension of the bag walls for a predetermined thickness of wall to be constructed.

After vertically affixing the matrix grid 56, as shown in FIGS. 25 and 26, fluid hydraulic cement mortar is pumped or fed into the bottom of bag means 55, and pumping is continued until the bag means is filled to desired height. As before, the fluid pressure expands the bag walls 55a to predetermined generally uniform extent, determined by the locations of the stop means 60b and pumping is otherwise controlled in conjunction with the increasing weight of the fluid mortar to distend the bag walls outwardly in the areas between said spaced stop means (see FIG. 28). FIGS. 27 and 28 illustrate the resultantly formed, concrete wall structure 55c.

Figure 29:
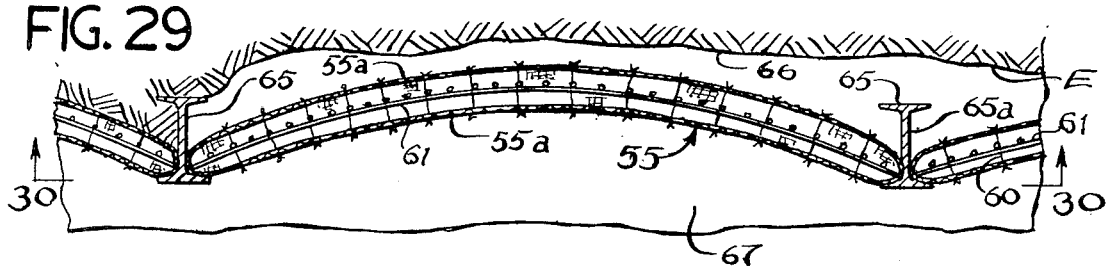
FIG. 29 is a fragmentary horizontal cross-section through an earth situs, showing two stages of a procedure for forming cast-in-place sheet piling in situ between anchored spaced soldier beams, and utilizing a variation of the method shown in FIGS. 25 to 28.
Figure 31:
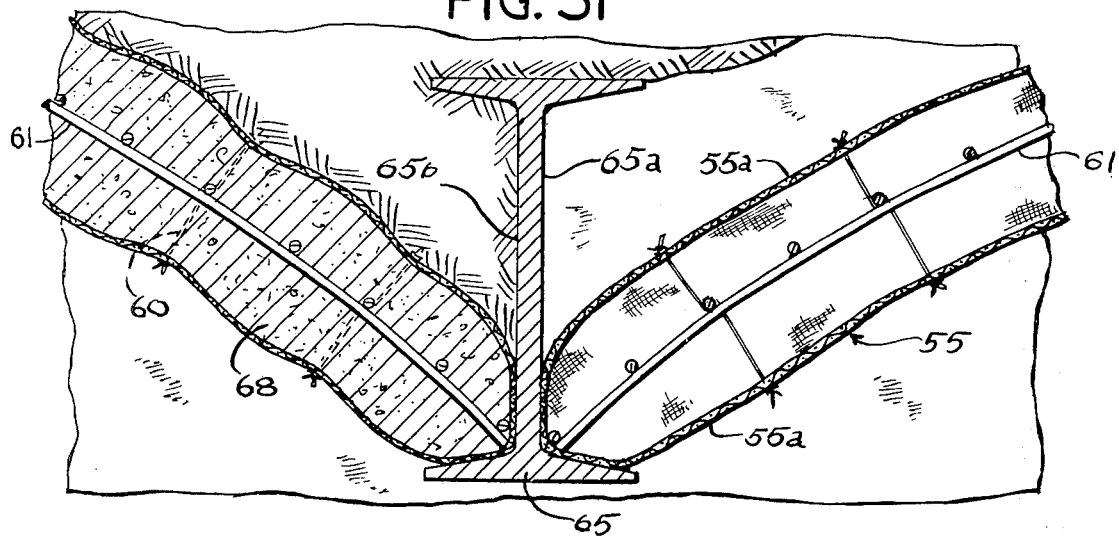
FIG. 31 is an enlarged fragmentary cross-section, taken substantially on the line 31, 31 of FIG. 30, illustrating two stages in the modified method for producing curvate sheet-piling.
Figure 30:
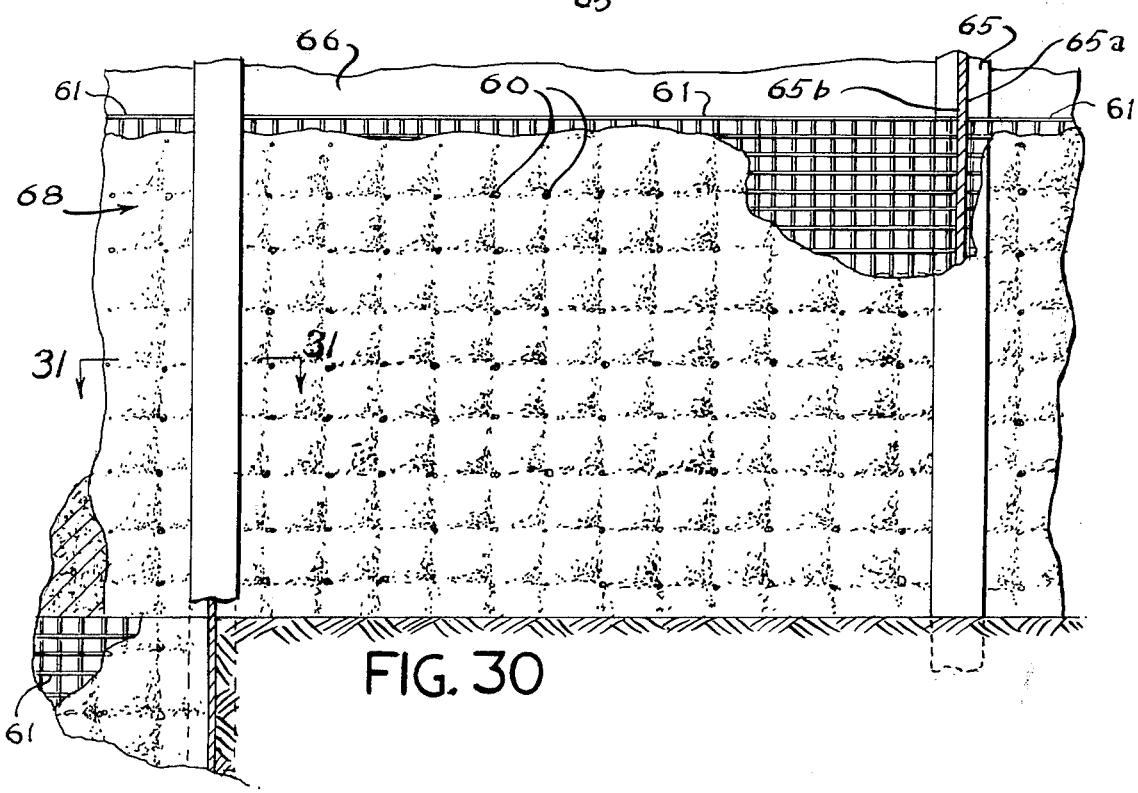
FIG. 30 is a fragmentary front elevation, partly broken away and in section, of the sheet-piling, substantially as viewed on the line 30, 30 in FIG. 29.

FIGS. 29 to 31 illustrate an adaptation of the method generally as described above in connection with FIGS. 25 to 28, to produce a new type of lagging wall when excavating an earth situs close to a building, for example. Like parts, therefore, will be given like numerals, unless otherwise noted.

Referring first to the central sections of the structures shown in FIGS. 29 and 30 (the later of which corresponds to FIG. 25), this method adaptation includes first driving laterally spaced metal soldier-beams 65, 65 vertically into the earth situs E, and a minimum of additional earth is excavated in the area between two adjacent said spaced soldier-beams, as shown at 66 in FIG. 29, and to the required depth as best indicated at 67 in FIG. 30.

Next a single web, matrix grid and porous bag combination, generally as shown in FIGS. 25 and 26, is forcibly bowed into concave-convex arcuate shape, against strong spring-like resiliency of the laterally extending wires of the mesh wire grid, and then is yieldingly compressed in arcuate shape between the webs 65 of the two adjacent solider-beams, with the end edges of the grids seated within corners defined by webs 65a and the respective forward cross-pieces 65b. Thus, the rigid arcuate grid is positioned to translate outward bending forces applied at the convex side into lateral forces against the soldier-beams, to minimize the bending forces and, therefore, take much greater loads applied at the convex side than would be possible with use of a flat matrix grid of the same size and proportions.

With this bag and matrix grid combination securely in place as shown at the centers of FIGS. 29 and 30, and at the right of FIG. 31, fluid hydraulic cement mortar is pumped into the bag means 55, (as before for FIGS. 25 and 26), to fill the bag means and distend the spaced bag walls 55a against the tensional restraint of the tie-elements 60a as shown at the left of FIGS. 30 and 31 (see also FIGS. 27 and 28 showing the related resultant condition).

Upon settin and hardening of the resultant curvate concrete wall 68, the earth may be excavated below the same, for installing another wall 68 in the cleared spaces as shown as the lower left of FIG. 30. In fact, the process may be repeated to place a plurality of curvate piles 68, edgewise and one below the other, according to the excavation depth required, and the breadths and thickness of the sheet walls 68 for particular conditions.

This concrete wall-forming method is very economical as compared with methods employing wood lagging, for example. It is particularly advantageous because the formed concrete wall structure is permanent and, therefore, eliminates the former requirement to allow additional space at the inner side of the finished wall, which had to be excavated, often under extremely cramped conditions next to an existing building, for example, to permit the removal of wood lagging or wales which would otherwise rot in the ground and cause possible damage. In other words, the present method eliminates the need for additional difficult excavation of earth from behind the sheet lagging to the full depth thereof, and also eliminates filling in the said additional excavated space with earth.

FIGS. 32 to 34 illustrate another method as for forming an elongated, arched concrete culvert 69 on a concrete slab 70, or other flat surfaced area of a situs. To this end an arched matrix grid 61 and enclosing bag means 72, combination 73, on the order of the similar combination indicated by the numeral 67 in FIGS. 29 to 31, may be mounted on the slab 70 with the lower edges of the grid anchored to projecting rods 71, previously anchored in the slab as shown in FIG. 33.

Fluid cement mortar, as before, is pumped into the closed bag means 72 to expand and fill the bag means, against substantially uniform tensional restraint of the tie-elements 74, 74, thereby forming an arched wall 69 of substantially uniform thickness. Fluid mortar which oozes through the pores of the bag wall, in the manner described heretofore, bonds and fluid-seals the flattened end edges of the wall to the slab 70 (see FIGS. 32 and 34).

The grid 61 may be selectively located closer to the inner bag wall in some instances, to facilitate uniform expansion of the bag walls, against gravitational forces effective upon the fluid grout when pumped into the bag means.

FIGS. 35 and 36 illustrate use of the method and means described above for FIGS. 1 to 4 and 4 and 4a, to form a bulbous or further enlarged cast-in-place repair body 29a on the cylindrical post 23 (see FIG. 36). In other words, the rigidly maintained wire mesh matrix 26a of FIG. 35 is like the matrix means of FIG. 4, except for the enlarged peripheral girth and changed shape. The sleeve-like bag means 22 is as before, except that more fluid cementitious material is required for expanding the bag walls to the larger body size. The post 23b shown, however, is of circular cross-section requiring a circular cage-like matrix 26a which is rigidly constructed for tensionally restrained expansion of the bag wall 22, uniformly in all radial directions, thereby to produce a strong, uniformly shaped, concrete repair body 29a, as shown in FIG. 36, and in which the mesh matrix 36a has been removed. A reinforcement 24a may be included in the repair body if needed.

Figure 37:
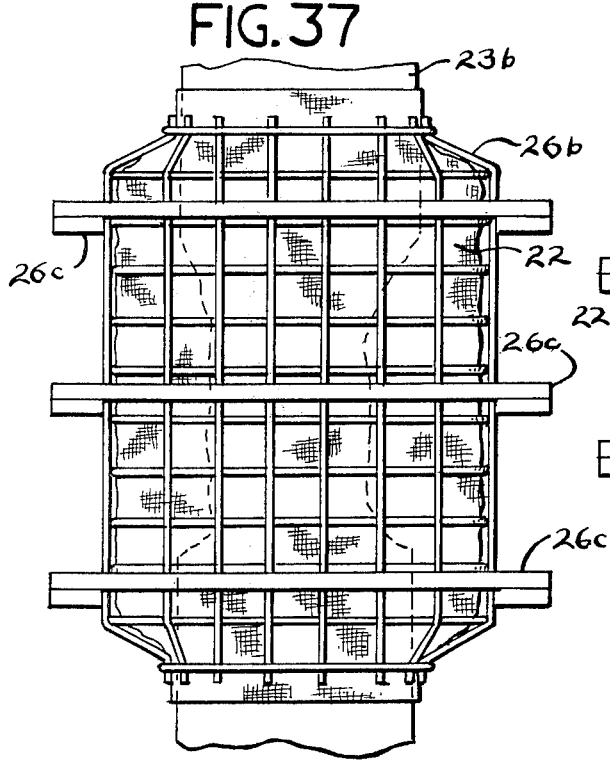
FIG. 37 is a view corresponding to FIG. 4, but illustrating a different type of matrix means utilized to produce a bulbous repair of square or rectangular cross-section on an existing structure of similar cross-section.
Figure 38:
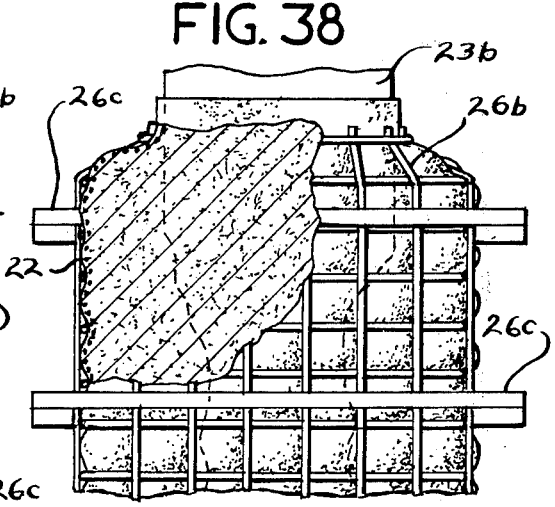
FIG. 38 is a view corresponding to the upper part of FIG. 37, but partly broken away and in section, to show the bulbous shape formed by the method described for FIGS. 4 to 7, and FIGS. 35 and 36.

FIGS. 37 and 38 show use of the same method as for FIGS. 35 and 36, except that the cage-like wire mesh matrix 26b has a squared cross-sectional shape for repairing a concrete post 23b of similar shape. For rigidly maintaining the squared shape of matrix 26b against strong pressure of fluid mortar within the bag wall 22, a plurality of strong, rigid square frames 26c, may be secured about the matrix as shown in FIGS. 37 and 38. FIG. 38 shows the fully formed, squared repair body bonded to the post 23b, after hardening, but before removal of the matrix means 26b and the restraining frames.

FIGS. 39 and 43 illustrate still further modifications of the invention, generally as described above and more particularly as related to FIGS. 35 and 36, but adapted for repairing a horizontally extending pipe 77 of metal and other material, as in an excavated earth situs.

Referring to FIGS. 39 to 42 in general, and to FIGS. 39 and 40 in particular, a wall-shaping matrix 78, comprising a sheet of openwork material, such as square-mesh wire fencing material, and of requisite length, is formed and secured about the pipe 77, in zig-zag fashion to have peripherally spaced inner nub extents 79, 79 engaging along the pipe, and likewise spaced outer nub-extents 80, 80 about an imaginary cylindrical surface concentric with the outer surface of the pipe (see FIG. 40). Next, a sleeve-type bag means of porous fabric 81 is formed, in known manner about the spaced outer nub-extents 80, and the opposite end of the formed sleeve are tightly secured to pipe 77, as by means of wire windings 82, 82 as shown in FIG. 39. For limiting radially outward distension of the sleeve or bag wall 81, axially and peripherally spaced tie-wires or elements 83, 83, anchored on the matrix 78 may be provided with suitable stop means 83a.

Upon pumping fluid, such as hydraulic cement mortar, into the bag-enclosed cylindrical space 85, the porous bag wall 81 is substantially uniformly distended against tensional restraint of tie-elements 83, until the water-cement ratio is suitably reduced in the manner previously described. The resultantly formed concrete pipe-lining and reinforcing wall 86, as shown in FIGS. 41 and 42, will have substantially uniform thickness, and will be firmly bonded to pipe 77.

FIG. 43 corresponds to FIG. 42, but illustrates use of a wire mesh cylinder 83b attached to the tie-elements 83, and serving as stop means to accomplish substantially uniform shaping of the liner wall 86. The mesh tensioning member 83b is selectively removable after the formed concrete pile liner has acquired a permanent set.

FIGS. 44 and 45 illustrate a modified form of the mold structure described in connection with FIGS. 39 and 40. As before a zig-zag or undulating wall-shaping matrix 78a of heavy wire mesh or rigid openwork material, is forcibly formed in annular shape about the pipe 77 while retained within a closed, elongated annular bag 90. For this purpose the bag may be initially of tubular shape, adapted to be formed and joined in annular shape, as by means of suitable stitching means after the matrix 78a is in place. Also contained within the annular cavity 90c, defined by the enclosing bag walls, may be a cylindrical matrix part 91, of square mesh wire, which is secured to the other portions of the wall-shaping matrix 78a as a part thereof. A multiplicity of tie wires 92 are shown connected between the matrix part 91 and the generally cylindrical outer bag wall 90a, for limiting outward distension of the latter upon pumping hydraulic cement mortar, substantially as previously described in connection with FIGS. 41, 42, and 43, and as indicated in chain-dotted lines in FIG. 44.

In each of the forms of the invention shown in FIGS. 39 to 49, the body-shaping matrix means may first be formed in appropriate rectangular size, flatwise upon a suitable surface (not shown). This flat matrix means then may be forcibly formed or bent around the pipe 77, to connect mating ends together with or without the fabric material attached as necessary or convenient. In other words, of the several forms of the invention shown in FIGS. 44 to 49, the matrix is best formed about the pipe 77 while contained in a partially formed porous fabric bag, of requisite cross-sectional shape and size, the bag walls being suitably closed about the positioned annular matrix means, as by thread-stitching or other means to form a closed fabric container defining the body-forming annular cavity (see FIGS. 44 and 45, for example). The cement mortar may be pumped into the thereby defined closed annular, body-forming cavity by suitable means as shown and described in connection with FIGS. 39 to 43. Like parts in FIGS. 39 to 49 are given like numerals unless otherwise noted.

FIG. 50 corresponds to FIG. 41, but shows a formed modified matrix structure 78, including a cylindrical wire mesh grid 91 secured to the outer portions thereof, generally in the manner shown in FIGS. 45, 47, and 49. The tie-wires 83a, however, are shown proportioned to resist and limit outward expansion of the outwardly exposed bag wall 81 to extents which allow the cement mortar to encompass amd embed all portions of the cylindrical grid 91. The tie-wires in all of the forms of the invention shown in FIGS. 39 to 49 likewise may be made adjustable so that all portions of the matrices may be embedded in concrete to avoid exposure of metal of the same to possible damaging erosive action.

It is to be noted that the several above-described forms of the invention use different techniques variously employing porous-walled bag means and differing openwork shape-controlling matrices. It is also to be noted that in each instance distension or expansion of the porous structure-shaping bag walls is selectively uniformly controlled in some manner by a rigidly held or maintained matrix part, and some of generally uniform disposed stop means thereon for limiting or tensionally restraining such distension or expansion of the porous bag walls.

In the various forms of the invention generally as shown in FIGS. 13 to 31, it is readily apparent that the fabric bag means or containers for some purposes may be closed at the tops thereof, as indicated in chain-dotted lines at the top of FIG. 26, for example. The open-top methods referred to, however, have been found very convenient for controlling distribution of the fluid mortar to form concrete bodies to full shapes and proportions, especially when the fabric container forms a single channel of substantial length, depth and width (see FIGS. 13 to 18). The open-topped method referred to, moreover, makes possible the use of bags or containers of a wide range of flexible-wall forming materials. Porous fabric containers, however, are highly desirable where oozed out cementitious material provides improved bond between the cast-in-place bodies and surfaces of the situs contacted by the container walls.

While various forms of the invention described above call for use of porous fabric bags or containers, certain methods utilizing open-topped bags make it possible to use less porous, or even non-porous containers, because the level of the pumped fluid mortar can be continued toward the top of the container, and thereby force excess water over the top edges of the container walls and/or through relatively small weep hole suitably located in the container walls.

In all forms of the invention, however, use of porous bags or containers for forming concrete bodies will have a very important advantage, in that requisite lowering of the water-cement ratio in any given instance may be visibly observed by oozing or bleeding of the water and cement mortar through the fabric pores, or by the presence of imprints of the porous fabric molded on the surface of the solid concrete body upon removal of at least a portion of the fabric therefrom.

Further modifications of the invention may be resorted to without departing from the spirit thereof or the scope of the appended claims.

The embodiments of the invention in which an exclusive property or privilege is claimed are defined as follows:

1. A mold for forming cast-in-place concrete or like body from fluid, self-hardenable cementitious material to given shape and size in a subaqueous or other situs comprising: a flexible walled, bag-like container, a self-supportingly rigid matrix of openwork material received within said container, means for maintaining said matrix fixedly positioned at the situs, means for supporting said container with opposing walls in coextending relation to said fixedly positioned matrix, tension-restraining tie-elements of predetermined length connected between said matrix and opposing walls of said container for controlling limited oppositely outward distension of said opposing walls away from said matrix as determined by the length of said tie-elements, upon receiption of fluid self-hardenable cementitious material within said container to expand the walls thereof to such given shape and size of the body formed by the fluid cementitious material.

2. The mold of claim 1 wherein said container is of generally porous-walled fabric, and a plurality of said tie-elements are anchored to said matrix and have stop portions thereon engageable by the opposing wall portions of said container.

3. The mold of claim 1 wherein said matrix is elongated and said container is annular to surround said matrix and define an annular body-forming cavity containing said matrix.

4. The mold of claim 3 wherein said container is of closed tubular form containing said matrix therein.

* * * * *